(12) United States Patent
Bakr et al.

(10) Patent No.: US 11,843,399 B1
(45) Date of Patent: *Dec. 12, 2023

(54) SYSTEMS AND METHODS FOR CALCULATING FREQUENCY-LOCALIZED ADAPTIVE BEAMFORMER WEIGHTS INCLUDING CALCULATIONS OF INVERSE COVARIANCE MATRICES

(71) Applicant: Tarana Wireless, Inc., Santa Clara, CA (US)

(72) Inventors: Omar Bakr, Los Altos, CA (US); Stephen P. Bruzzone, San Jose, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,394

(22) Filed: Aug. 13, 2021

Related U.S. Application Data

(63) Continuation of application No. 16/600,143, filed on Oct. 11, 2019, now Pat. No. 11,108,451.

(51) Int. Cl.
*H04W 4/00* (2018.01)
*H04B 7/06* (2006.01)
*H04B 7/08* (2006.01)

(52) U.S. Cl.
CPC .......... *H04B 7/0617* (2013.01); *H04B 7/086* (2013.01); *H04B 7/0851* (2013.01); *H04B 7/0854* (2013.01)

(58) Field of Classification Search
CPC .. H04B 7/0617; H04B 7/0851; H04B 7/0854; H04B 7/086
See application file for complete search history.

(56) References Cited

U.S. PATENT DOCUMENTS

| | | | |
|---|---|---|---|
| 9,088,446 B1* | 7/2015 | Bromberg | H04L 25/03949 |
| 10,003,394 B2* | 6/2018 | Bromberg | H04B 7/0617 |
| 10,778,308 B1 | 9/2020 | Bruzzone et al. | |
| 11,108,451 B1 | 8/2021 | Bakr et al. | |

(Continued)

OTHER PUBLICATIONS

U.S. Appl. No. 16/600,118 titled "Systems And Methods For Calculating Frequency-Localized Adaptive Beamformer Weights Using Recursively Weighted Updating Across Subcarriers" filed Oct. 11, 2019, pp. all.

(Continued)

*Primary Examiner* — Abdelnabi O Musa
(74) *Attorney, Agent, or Firm* — Stoel Rives LLP

(57) ABSTRACT

Examples described herein include sliding window methods for calculating frequency-localized weights for adaptive beamformers. A window of subcarriers may be used to calculate a cross-correlation vector, inverse covariance matrix, or other components used in a weight calculation for a particular subcarrier. In some examples, a next window of subcarriers may include additional subcarriers, and may not include other subcarriers. The previously-calculated cross-correlation vector, inverse covariance matrix, or other components may be updated in accordance with updates and downdates associated with the added and removed subcarriers. The updated components may be used to generate weights for a subcarrier in the next window.

30 Claims, 9 Drawing Sheets

(56) References Cited

U.S. PATENT DOCUMENTS

| | | | |
|---|---|---|---|
| 11,133,850 B1 | 9/2021 | Bruzzone et al. | |
| 11,184,067 B1 | 11/2021 | Bakr | |
| 2005/0157776 A1* | 7/2005 | Ryu | H04B 7/0854 |
| | | | 375/148 |
| 2006/0012520 A1 | 1/2006 | Tsai et al. | |
| 2007/0211815 A1 | 9/2007 | Pan et al. | |
| 2008/0117997 A1 | 5/2008 | Maltsev et al. | |
| 2008/0207270 A1* | 8/2008 | Na | H04B 7/086 |
| | | | 455/562.1 |
| 2009/0323847 A1* | 12/2009 | Na | H04B 7/0697 |
| | | | 375/267 |
| 2010/0067366 A1 | 3/2010 | Nicoli | |
| 2011/0170521 A1* | 7/2011 | Wang | H04B 7/0617 |
| | | | 370/336 |
| 2012/0328033 A1 | 12/2012 | Jin et al. | |
| 2013/0010898 A1* | 1/2013 | Chiang | H04L 25/03891 |
| | | | 375/316 |
| 2013/0128935 A1* | 5/2013 | Janani | H04B 7/0617 |
| | | | 375/267 |
| 2013/0195166 A1 | 8/2013 | Reial | |
| 2015/0381259 A1* | 12/2015 | Bromberg | H04L 25/0234 |
| | | | 370/201 |
| 2017/0192100 A1* | 7/2017 | Dickman | G01S 19/21 |
| 2017/0245776 A1 | 8/2017 | Kurtz et al. | |
| 2018/0227037 A1 | 8/2018 | Ahmed Ouameur | |
| 2019/0379562 A1 | 12/2019 | Rane | |

OTHER PUBLICATIONS

U.S. Appl. No. 16/600,143, titled "Systems and Methods for Calculating Frequency-Localized Adaptive Beamformer Weights Using Sliding Windows Across Subcarriers", filed Oct. 11, 2019, pp. all.

Lie, et al., "Efficient Adaptive Array Receiver for OFDM based Wireless Local Area Networks (WLAN)", IEEE Trans. Consumer Electronics, vol. 50, No. 4, Nov. 2004, pp. 1101-1106.

U.S. Appl. No. 16/985,036 titled "Systems and Methods for Calculating Frequency-Locauzed Adaptive Beamformer Weights Using Weighted Overlapping Beamform and ADD Techniques Appued to Adjacent Subbands" filed Aug. 4, 2020.

* cited by examiner

US 11,843,399 B1

SYSTEMS AND METHODS FOR CALCULATING FREQUENCY-LOCALIZED ADAPTIVE BEAMFORMER WEIGHTS INCLUDING CALCULATIONS OF INVERSE COVARIANCE MATRICES

CROSS REFERENCE TO RELATED APPLICATION(S)

This application is a continuation of U.S. patent application Ser. No. 16/600,143, filed Oct. 11, 2019, issued as U.S. Pat. No. 11,108,451 on Aug. 31, 2021. The aforementioned application is incorporated herein by reference, in its entirety, for any purposes.

TECHNICAL FIELD

Examples of wireless communication systems are described herein, for example, wireless systems in wide-area networks (WANs) utilized in cellular and wireless internet services. Examples of systems and methods are described herein that may utilize spatial processing algorithms to achieve higher spectral efficiency and enable more efficient handling of frequency-selective wireless channels.

BACKGROUND

Today's wireless wide-area networks (WANs), e.g., as utilized for cellular and wireless internet services, suffer from data capacity shortages due to the proliferation of data-hungry devices such as smart phones, tablets, and notebooks. The number of devices accessing wireless networks, and their demand for ever greater data transfer speeds and broadband network capacities, are growing at exponential rates. These data demands are causing severe congestion in the limited radio frequency (RF) bands allocated for such services. In addition, new fixed wireless networks are coming to market as lower-cost and faster-deploying alternatives to fiber-based residential and enterprise broadband services, further compounding these capacity shortages and further saturating existing wireless RF bands.

While integrated circuit technology continues to advance and computing speeds to grow at exponential rates in accordance with Moore's law, the fundamental radio resource limitation arising from spectrum saturation is impeding further capacity improvements in today's wireless networks. As a result, many companies are focusing attention on the under-utilized millimeter-wave (mm-Wave) bands at radio frequencies of 24 GHz and above (e.g., the 60-GHz band). The large amount of untapped spectrum available in these higher bands appears on the surface as a potential remedy for the capacity crunch, especially as recent advances in silicon technology are making radio transceivers in those bands increasingly cost-effective. However, their poor propagation characteristics and higher attenuation factors above 6 GHz are making it difficult to use these bands for wireless access networks, as they require much higher tower densities per unit area than traditional cellular bands.

In parallel, many modern wireless systems have adopted multi-antenna radio architectures, e.g., antenna arrays, and associated spatial multiplexing methods in an effort to secure the needed capacity increases. Their goal is to exploit the spatial diversity afforded by antenna arrays to achieve a capacity multiplier and/or cell densification through extensive frequency reuse. Such spatial processing systems are referred to variously as adaptive arrays, beamforming, multiple-input-multiple-output (MIMO) spatial multiplexing, and space-time-adaptive processing (STAP), to name a few.

Among currently deployed spatial processing methods, the MIMO multiplexing class is most common. MIMO spatial multiplexing is usually implemented using a time-division duplex (TDD) protocol that transmits multiple, independent data streams on various antenna elements during a node's transmit cycle, while the receiving node uses channel sounding information to invert the propagation channel connecting the two node arrays, thus separating and recovering the transmitted streams at the receiving end. (While frequency-division duplexing (FDD) MIMO protocols are also possible, TDD enables more efficient channel sounding procedures.) A drawback of MIMO spatial multiplexing is that it may be susceptible to interference from uncooperative emitters, in so far as such emitters are not designed to participate in the MIMO channel sounding protocols critical to achieving MIMO frequency reuse through channel inversion. A more fundamental drawback of MIMO spatial multiplexing is that it is heavily dependent on channel propagation characteristics for successful operation. For example, most outdoor channels, where most of the capacity crunch is taking place, fall short of the rich multipath diversity needed to support low-noise channel inversion and deliver the capacity improvements promised by MIMO. Accordingly, MIMO spatial multiplexing has proliferated primarily for indoor local-area network (LAN) applications, especially in Wi-Fi product offerings, where outside (uncooperative) signals are attenuated by walls, and the richer indoor multipath channels often support significant MIMO capacity multipliers, e.g., factors of 2 to 4 and sometimes greater.

DETAILED DESCRIPTION

Figure 1:
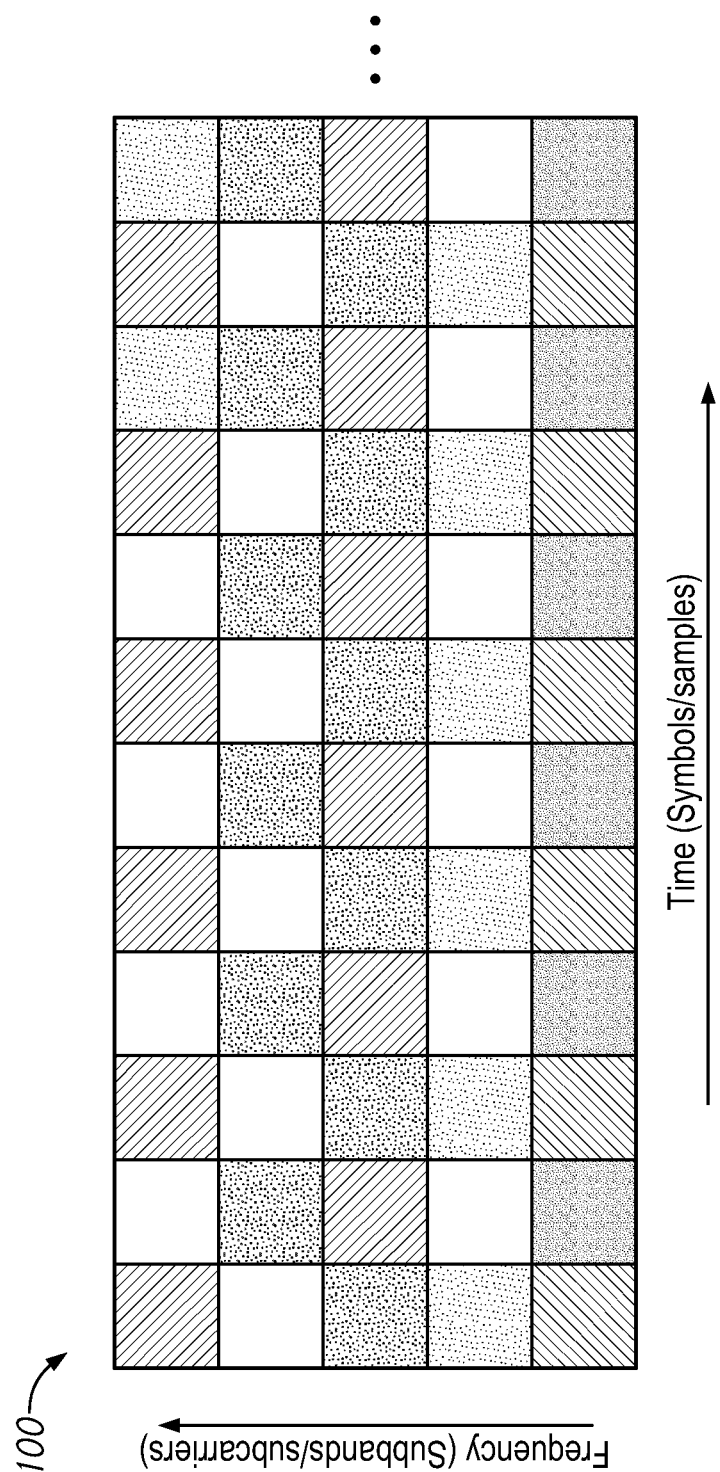
FIG. 1 is a schematic illustration of subcarriers and symbols arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

In contrast to more traditional MIMO spatial multiplexing methods based on channel inversion, the largely untapped domain of STAP processing is a more effective spatial processing technology for outdoor wireless WAN applications, offering an alternative solution to alleviate the capacity crunch through multiple-access (e.g., multiple-link) frequency reuse without requiring multipath channels for its operation. A subclass of STAP processing, adaptive beamforming, is of particular interest in this regard, as it adapts spatial filters, e.g., antenna array beamformers, to explicitly attenuate interfering signals while maximizing gain on desired signals. This technology, referred to herein as STAP beamforming, can be used to provide extensive frequency reuse to the point of dense in-cell spectrum sharing, such as supporting multiple point-to-multipoint (PtMP) links in a single cell or sector using the same frequencies, regardless of multipath levels, and without causing significant interference among the co-channel links. The STAP beamformer achieves this interference attenuation by forming spatial response-pattern dips, called spatial nulls, in the directions-of-arrival of all interfering rays arriving at the receiving antenna array.

Accordingly, STAP beamforming can significantly increase frequency reuse factors in the crowded lower frequency bands in some examples, readily providing large wireless WAN capacity multipliers (e.g., 6× or more) in outdoor WAN channels. Moreover, these STAP beamforming benefits may be independent of frequency band, applying equally to lower and higher frequency bands including the mm-Wave bands.

The capacity gains of STAP beamforming are not dependent on multipath, exploiting instead the angular diversity of arriving RF propagation rays on the antenna array. Moreover, when multipath is present, STAP beamforming is able to exploit it to even greater benefit if the adaptive beamformer is designed properly. The greatest frequency-reuse gains of STAP processing may generally be realized by employing STAP beamformers in a retro-directive TDD arrangement, wherein the beamformer is adapted during the receive cycle as an interference-nulling receiver, and used during the subsequent transmit cycle as an interference-minimizing transmitter that focuses maximum radiation on the intended receiving node and away from unintended nodes. For example, retro-directive operation may be used to enable the earlier-mentioned PtMP cell topology.

The use of antenna arrays and spatial processing in a wireless system requires extended payload transmission protocols to inject training data at regular intervals, in order to maintain the spatial solution (e.g., the STAP beamformer) in ever-changing real-world environments.

Most non-spatial communication signals already include various maintenance waveforms in the form of preambles, midambles, pilot tones, pilot codes, synchronization bursts, etc., all of which rob from payload capacity. These are normally transmitted repetitively in a recurrent protocol called a frame format. To these a spatially-equipped wireless system may need to add spatial (e.g., beamformer) training data, further compounding capacity losses if not designed judiciously. The STAP solution is renewed on each recurrence of the training data and applied as a fixed solution (e.g., as a fixed STAP beamformer) during the intervening payload section of the frame. While the existing maintenance waveforms may be exploitable to assist in spatial training, thereby reducing spatial training losses, the core tradeoff is to find ways to minimize the amount of additional spatial training data required. For efficient implementation the spatial training data may be incorporated into a fixed segment within the frame, with the frame sized in turn so that the training data, referred to as the training sequence, recurs at regular time-intervals as required to maintain the spatial solution.

In theory, the maximum payload capacity that can be sustained by a STAP system utilizing adaptive beamforming increases with the number of antennas. However, the amount of training data and related processing required to adapt the beamformer also grows with the number of antennas. The amount of processing required to compute a STAP beamforming solution can be either cubic or quadratic in the number of antennas in theory, depending on the desired accuracy of the STAP solution. Comparably, the amount of training data required, expressed as the required time-bandwidth product (TBP) of the training data, grows linearly with the number of antennas. As a rule of thumb, the training TBP of an adaptive beamformer, expressed as a number of training samples, should be at least 4N samples for an N-element antenna array. While the former computing costs will continue to decrease with the advancement of silicon technology, the latter training TBP, which displaces valuable payload data and reduces the effective data (e.g., payload) throughput of the system, is a fundamental system cost that is independent of silicon technology.

Training overhead, defined as losses in system payload capacity and spectral efficiency due to the need to train and maintain the STAP beamformers, is generally proportional to the product of the training TBP (for a single training instance or training sequence), and the required frequency such training/retraining operations. The latter is dictated by channel dynamics. If the wireless channel is static, the system can train the STAP beamformer a single time and continue thenceforth to use it indefinitely into the future. In this idealized case the training overhead would be essentially zero, having negligible impact on system and network payload capacity. In practice, however, RF channels are time-varying, and interfering links come and go. The average time in which the channel remains relatively static is known as the coherence time. The ratio of the training TBP to the coherence time represents the training overhead required to maintain the STAP solution. This overhead can reduce payload capacity by significant percentages, e.g., 10% to 30% or more in typical wireless applications. This overhead can be reduced somewhat by using the actual payload for training, in addition to known pilot symbols, but this also comes with drawbacks, including performance degradations, added latency, and risk of capture by an interfering signal.

While STAP beamforming may provide frequency reuse benefits independently of multipath, it must be designed to contend with the multipath variants that occur in outdoor environments. Outdoor multipath may be nearly absent in line-of-sight (LOS) network conditions, but more commonly it occurs in forms that can be problematic. In particular, outdoor multipath presents greater multipath ray delays than indoor multipath. The longer delays create a multipath channel that varies rapidly in frequency relative to the wireless system bandwidth. For MIMO spatial multiplexing methods, these frequency variations may further hamper the inversion of a channel that defies a unified characterization across the signal bandwidth. For STAP beamforming, the frequency variations may cause misadjustment problems, e.g., a failure to fully converge the solution, hence admitting excessive amounts of noise and residual interference into the beamformer output.

Some methods of STAP beamforming attempt to address these outdoor multipath problems by partitioning the system bandwidth into smaller, contiguous frequency intervals called subbands, small enough that channel variations become negligible over the subband, e.g., the subband channel appears "flat" in frequency. Separate STAP beamformers are then applied to these subbands, producing subband-localized solutions having deeper convergence and greater accuracy than a wideband solution in some examples. While the subband approach may work to restore beamformer convergence, it comes at the cost of a proportional increase in beamformer training time, and consequent payload capacity losses, as the reduction in bandwidth embodied by a subband must be compensated by an equal-factor increase in training time in order to meet the required beamformer training TBP. Wireless WAN geometries may attempt to manage this limitation by using larger than ideal subbands, trading off capacity losses due to the incomplete convergence this yields, against losses due to the additional training overhead that would be required by smaller subbands.

Examples of advanced STAP beamforming described herein may significantly improve that trade space, by generating frequency-localized beamforming solutions using frequency-domain formulations that simultaneously minimize beamformer training overhead in some examples. These advanced STAP beamformers are adapted in the frequency domain, e.g., on the bins of a fast Fourier transform (FFT), as a means to achieve the desired frequency localization characteristics, in one example by using frequency interpolation of practical-sized subbands in lieu of going to smaller-sized subbands. Additional examples are shown wherein frequency localized beamforming is achieved through recursive exponential and sliding window methods applied to FFT bins. While the advanced STAP beamformers are described herein as applied to systems employing orthogonal frequency division multiplexing (OFDM) modulation, they apply equally to systems utilizing any form of modulation, including for example the extensive class of single-carrier modulations. For such non-OFDM modulations, the OFDM subcarriers defined in the following represent generic bins of an FFT applied to the array data streams, from which the advanced STAP beamformer would be computed, and from which the post-beamforming time-domain data would be recovered via standard inverse FFT practice, e.g., the use of FFT block overlap-and-add or overlap-and-save methods. Accordingly, although examples are described herein with reference to subcarriers, the term subcarriers is to be understood herein to generally refer to frequency bins. In some examples, subcarriers may be implemented using subcarriers in OFDM schemes or other modulation schemes. However, in other examples, subcarriers may be implemented using generally any frequency bins.

Many modern wireless systems (e.g. Wi-Fi, WIMAX, LTE, 5G-NR) have adopted OFDM and/or OFDM multiple-access (OFDMA) as a communication standard. Under OFDM the frequency domain is divided into a set of equally spaced subcarriers, and the time domain is divided into equally spaced symbols as shown in FIG. 1. FIG. 1 illustrates subcarriers and symbols in accordance with examples described herein. The y-axis represents frequency, while the x-axis represents time. The frequency domain (e.g., y-axis) is divided into subbands, with five subbands being shown in FIG. 1, although any number may be used. Each subband contains a specified number of subcarriers, not shown, corresponding to the bins of an OFDM Fast Fourier Transform (FFT) residing within that subband. The time domain (e.g., x-axis) is divided into FFT blocks, referred to herein as OFDM symbols. Twelve OFDM symbols are shown in FIG. 1, although any number may be used within the same or a different amount of time by resizing the FFT as needed. Under OFDM, payload data are transmitted on each subcarrier in each symbol, typically as quadrature amplitude modulated (QAM) constellation samples. In addition, a subset of subcarriers may be designated as non-payload pilot symbols, which may be used to provide amplitude and/or phase reference.

STAP beamforming as employed herein refers to a STAP method of processing received antenna array data after the latter have been down-converted to baseband and digitized as complex baseband data streams (e.g., multiple down-converters and/or digitizers may be used to provide digitized baseband data streams). The STAP beamformer may be viewed as compartmentalized into a weight calculator and a linear combiner. The STAP beamformer weights, as generated by the weight calculator, are applied to the linear combiner, which combines signals as received on the various elements of an antenna array to achieve spatial selectivity. Spatial selectivity may be used to enhance the detection and extraction of signals from complex RF environments, to enhance the signal to interference plus noise ratio (SINR), to overcome multipath distortion, and/or to remove detrimental interference via interference cancellation (IC). The weights may be derived and/or adapted by a variety of methods, some of which are described herein. The goal of the STAP beamformer is to provide optimal or near optimal system performance at each frequency domain subcarrier in each time-domain OFDM symbol.

The optimum weights are a function of the channel response(s) of all signals arriving at the array, which in turn is a function of the environment. If the channel varies rapidly in both domains (e.g., time and frequency), then the optimal solution will also vary rapidly in both domains, and the same computation/optimization will need to be repeated many times across the time/frequency grid shown in FIG. 1, adding significant capacity-robbing overhead to the system in terms of both communication and computation.

Figure 2:
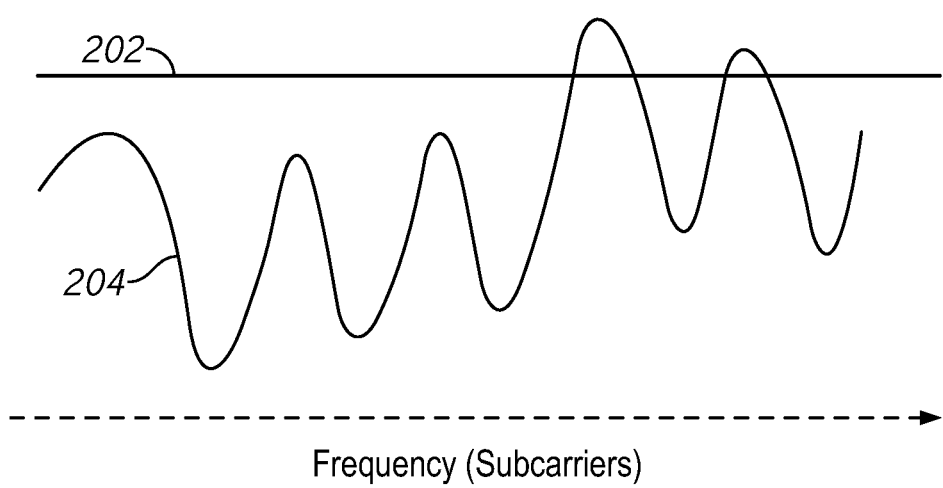
FIG. 2 is a schematic illustration of examples of channel frequency responses arranged in accordance with examples described herein.

The variation in the frequency domain is a consequence of multipath (e.g., the signal bouncing among different objects in the environment) leading to different copies of the same signal arriving at the destination at different delays. The relative delay between the different copies arriving at the receiver/destination creates variations in the frequency response of the channel. The larger the delay spread between the different paths traversed by the signal, the more rapid the variation in the frequency domain (see FIG. 2). FIG. 2 is a schematic illustration of examples of channel frequency responses arranged in accordance with examples described herein. FIG. 2 includes frequency along the x-axis (e.g., multiple subcarrier frequencies are shown). An example flat frequency response is shown as response 202, where a response of a channel is the same across multiple frequencies. An example frequency selective frequency response is shown as response 204, where the response of the channel varies across frequencies.

Figure 3:
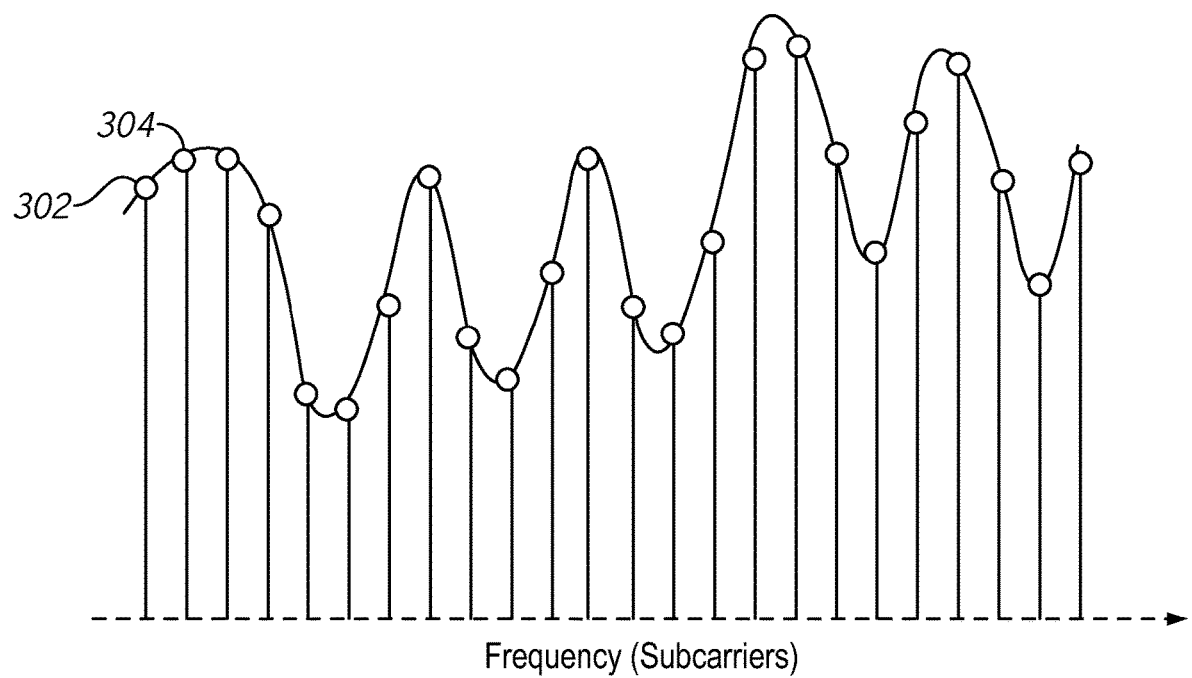
FIG. 3 is an example waveform, in the frequency domain, with illustrative subcarriers in accordance with examples described herein.

If the rate and range of frequency variation are large, an optimal solution may differ from one subcarrier to the next, as shown in FIG. 3. In the example of FIG. 3, a STAP beamforming solution (e.g., weights for use in beamforming) is shown for each of a plurality of subcarriers in a frequency selective channel. The solution is illustrated conceptually as a dark dot, and each subcarrier as a vertical line. So a solution at subcarrier 302 may be different than one at subcarrier 304. Similarly, solutions may be different at multiple other subcarriers shown in FIG. 3. Calculating a STAP beamforming solution for each subcarrier may be computationally cumbersome and/or prohibitive in terms of the training TBP required.

Figure 4A:
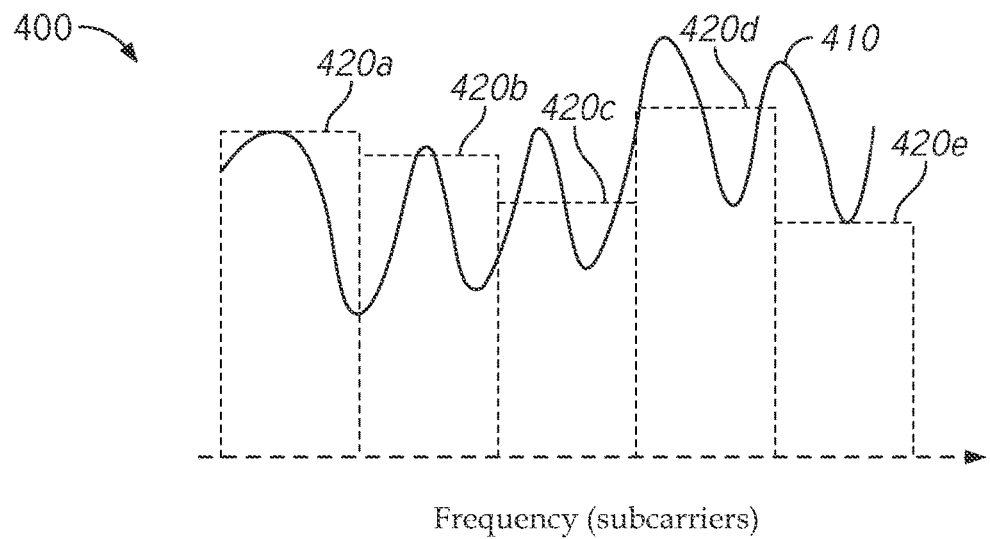
FIG. 4 A-D illustrate example waveforms, in the frequency domain, with corresponding illustrative STAP solutions.
Figure 4B:
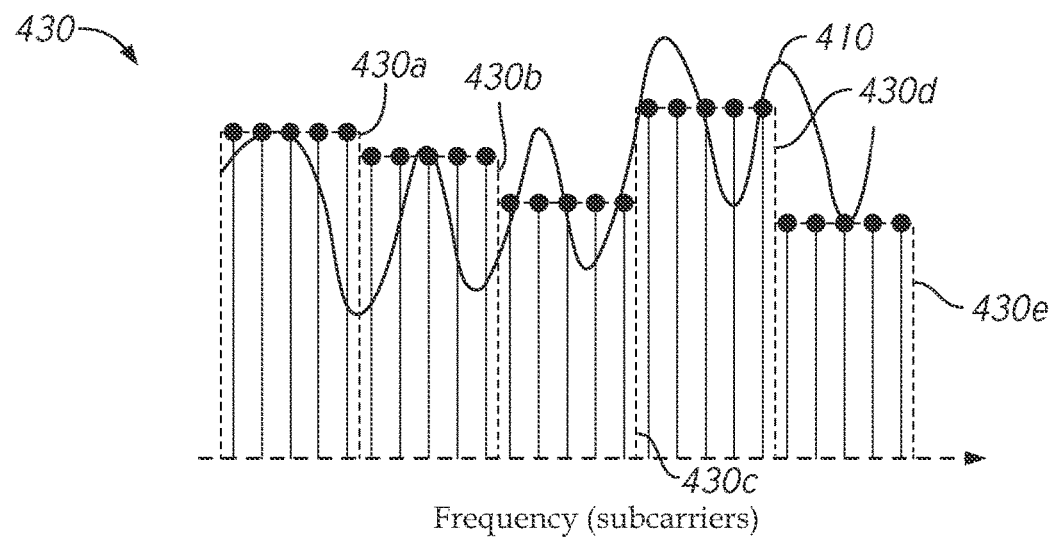
Figure 4C:
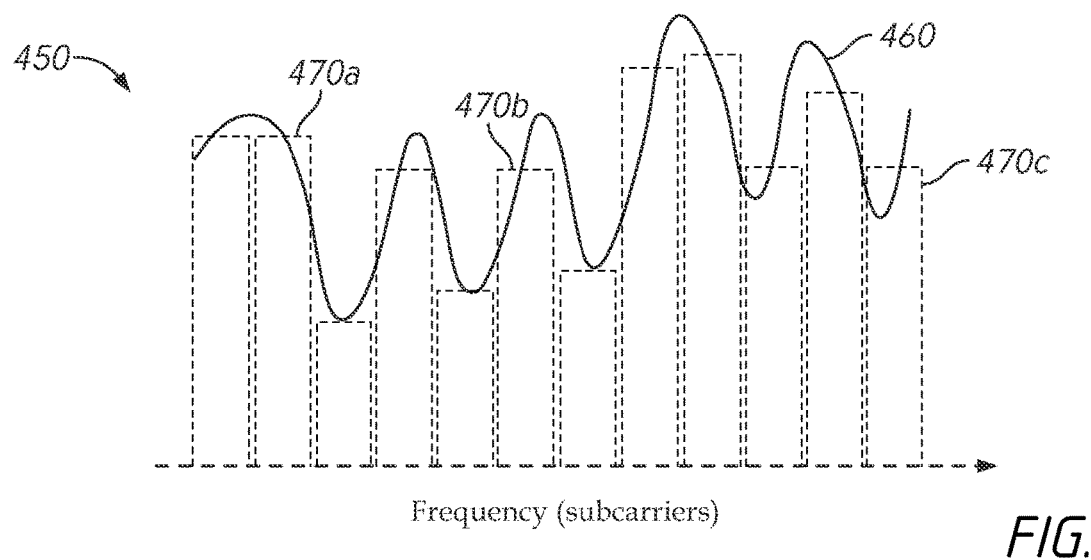
Figure 4D:
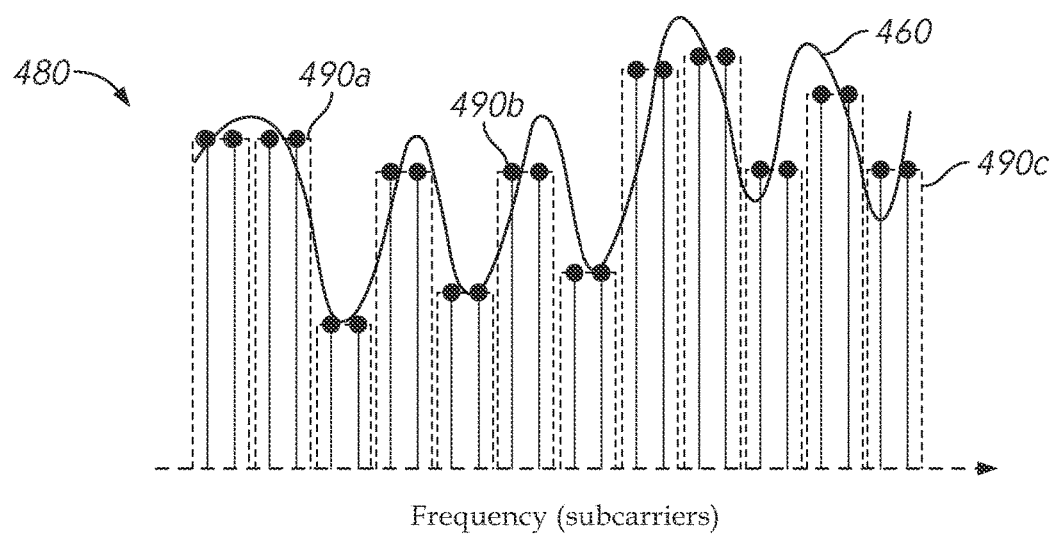

To deal with this issue, the frequency band of interest may be broken into smaller subbands as shown in FIG. 4A-D. A STAP solution is then generated over each subband independently. FIG. 4A-4D illustrate solutions (e.g., weights) that are calculated at a single moment in time (e.g., for one OFDM symbol) for subbands in the frequency domain. FIG. 4A depicts a curve 410 abstractly representing a frequency-varying optimal or goal solution, superimposed on multiple subbands—e.g., subbands 420*a-e* as shown. These subbands are shown as equal in width, although unequal subbands may be used in other examples. In FIG. 4B, a single solution is shown in each subband as a dark dot applied to all subcarriers within the subband, where the individual subcarriers are shown as vertical lines. Looking in detail at subband 420*a*, for example, a solution corresponding to a "maximum" of the optimal solution 410 in the subband 420*a* may be used on each of the five subcarriers in subband 430*a*. The vertical distances between the dots in subband 430*a* and the optimal solution curve 410 are abstract visual indicators of each subcarrier's performance shortfall from the optimal solution, illustrating that shortfalls can be significant, particularly at subband edges, for the rate of frequency variation shown. FIGS. 4C and 4D are analogous to FIGS. 4A and 4B, but using narrower subbands. In the example of FIG. 4C, the frequency range shown is divided into 12 subbands. In FIG. 4D, two subcarriers are illustrated in each subband, and a same solution (e.g., weights) may be used for each of the two subcarriers in the subband. Note that the solutions shown in FIGS. 4C and 4D may be closer to the optimal solution 410, with smaller performance shortfalls than in FIGS. 4A and 4B where a wider subband was used.

FIGS. 4A-4D represent an approximation/simplification of a more optimal solution that might be achieved, e.g., on a subcarrier basis. Of course, the smaller the size of the subband, the closer the solution is to the optimal. However, the spatial training tradeoffs as outlined earlier require a more nuanced solution than simply reducing subband sizes without restraint.

As a first consideration, the overall computational complexity will scale linearly with the number of subbands, because the computation must be repeated for each subband independently. In addition, the required beamformer training TBP requirement must be met in as few OFDM training symbols as possible, to conserve the maximum possible number of OFDM symbols for payload conveyance. Accordingly, each subband must be wide enough to contain a sufficient number of subcarrier samples to adequately train the beamformer. If the subband is too narrow in bandwidth, then additional training symbols (time) will be required in order to supply the total number of samples required to meet the training TBP requirement. These additional training symbols would subtract from payload capacity. Another key consideration is that the deviation from ideal performance may become worse toward subband edges, e.g., as depicted in FIG. 4B, as a subcarrier at the edge of the subband will have significant correlation with nearby subcarriers in the neighboring subband, yet will not use them in computing the current-subband STAP beamformer solution.

A number of STAP beamforming algorithms may be used as a basic element in the efficient STAP beamforming methods to be described herein. For example, a least-squares (LS) solution may be used to calculate a STAP solution (e.g., weights used by a STAP beamformer), taking the form $$Xw \stackrel{?}{=} s \quad (1)$$

where X is an M×N matrix (M≥N to ensure a unique solution) containing the M-sample training data sequence as received on a given system node N-element (antenna) array along with other interfering signals and noise, w is the beamforming weight vector (N×1) to be generated, and s is the training sequence, a vector (M×1) of known training data. The rows of matrix X and elements of vector s may represent time-domain samples or frequency-domain (FFT bin) samples with equivalent results, although in the present context FFT bins are intended, in which case the matrix X rows and vector s elements may correspond to the set of subcarrier bins spanning a given subband for one or more training symbols. In accordance with adaptive beamformer training TBP requirements, the number of training samples should meet the minimum requirement that M>4N. If multiple training symbols are used, e.g., in order to meet training TBP requirements, the rows of matrix X and training sequence s may be arranged as abutted training symbol time-domain or frequency-domain samples, or as such samples interleaved in any other ordering, provided it is consistently applied to each. In detail, assuming that $h_i$ is the N×1 vector representing the channel response from transmitter (stream) i onto the receiving array, and that $s_i$ is the M×1 training data transmitted by stream i, then X will be an M×N data matrix described by the sum over all such transmitters $$X = \Sigma_{(i)} s_i h_i^T + V \quad (2)$$

where V is an M×N matrix containing any non-network interference plus noise. Accordingly, the matrix X may contain all the signals received (desired, interference, and noise) at the antenna array for which stream i is intended. (More than one such stream i may be intended, for example, if (2) is describing a base node in a wireless network with multiple remote nodes, or if it is describing either node in a network utilizing multi-stream links, in which case the methods described herein will step through the streams i and process each independently as the intended stream.) In general such a weight computation may be repeated separately for each subband and each frame. Using a least-squares optimization criterion for stream i, the STAP beamformer weights solution $w_{opt}$ can be written as:

$$w_{opt} = \underset{w}{\arg\max}\, \varepsilon(w) = \underset{w}{\arg\max}\, \|e(w)\|^2 = \underset{w}{\arg\max}\, \|Xw - s\|^2 \quad (3)$$

where e is the error vector, and ε is squared magnitude of the error, both of which are functions of w. The error criterion is minimized by projecting s onto the column-space of X $$w_{opt} = (X^H X)^{-1} (X^H s); y = X w_{opt}. \quad (4)$$

The copy vector y produced as above is a least-squares estimate of the training sequence s. This solution is derived from the orthogonality principle, which states that for the square magnitude of the error E to be minimized, the error vector e must be orthogonal to the estimate $y = \hat{s}$ $$e^H \hat{s} = 0. \quad (5)$$

The term $X^H X$ in (4) is referred to as the covariance matrix $R_{xx} = X^H X$, and $X^H s$ as the cross-correlation vector $r_{xs} = X^H s$. The optimum least-squares solution can be written in terms of $R_{xx}$ and $r_{xs}$ as $$w_{opt} = R_{xx}^{-1} r_{xs}. \quad (6)$$

While the STAP beamformer weights $w_{opt}$ possess certain optimality properties (e.g., least-squares) for estimation of the training sequence s as received in the training portion of the frame, it is also effective when applied to the payload sections of the frame, providing interference mitigation and SINR maximization performance similar to that exhibited when applied to the training sequence data. While the strict optimality properties may be lost outside the training data, those losses may be negligible as a practical matter if certain conditions are met. As a general rule, use of a training sequence four times larger than the number of antennas on the array, fulfilling the condition M≥4N, is adequate to achieve negligible losses relative to the intended least-squares (or other criterion) property.

Equation 6 may be referred to as the Normal equation or the Wiener solution. In concept, a direct solution to a least-squares problem of dimension M×N involves four steps. First, the matrix $R_{xx} = X^H X$ of dimension N×N is computed. This step utilizes $O(MN^2)$ complex operations. Next, the matrix $R_{xx}^{-1}$ of dimension N×N is computed. This step utilizes $O(N^3)$ complex operations. Third, $r_{xs} = X^H s$ of dimension N×1 is computed, utilizing $O(MN)$ complex operations). Finally, $w_{opt} = R_{xx}^{-1} r_{xs}$ of dimension N×1 is computed, utilizing $O(N^2)$ complex operations. Summing these, the computational complexity is $O(MN^2) + O(N^3) \approx O(N^3)$ (assuming M=O(N)). The first two steps can be shared among all streams sharing the same receive array, as the matrix X is the same for all streams. Only $O(N^2)$ steps, which are stream-dependent, may require repetition for each stream. Therefore, the total computational complexity for computing the optimum beamforming vectors for all streams sharing the array may in fact be $O(N^3)$.

Alternative implementations of the least-squares solution utilizing QR-decomposition and Modified Gram-Schmidt Orthogonalization (MGSO) may provide improved numerical stability. The improved numerical stability may be achieved by performing all the numerical operations in the signal (voltage) domain, as opposed to the power domain embodied in (4). Both QR-decomposition and MGSO may keep the intermediate computations in the signal domain by avoiding an explicit formation of $R_{xx}$.

The least-squares STAP beamformer solution of (6) and its variants (e.g., a minimum mean-squared error solution, denoted as MMSE) may be solved using direct matrix inversion (DMI) or DMI-based algorithms. As the name implies, a DMI approach first calculates the covariance matrix $R_{xx}$ over all training data, then directly inverts the result using a standard matrix inversion algorithm. These algorithms share the property that the bulk of processing required to solve for the beamforming weights vector is performed after an entire training data set has been collected. As such, they may be referred to as batch-mode algorithms.

Alternatively, (6) can be solved recursively, giving rise to another class of algorithms that generate a recursive least-squares (RLS) solution. While RLS may not provide actual computational reduction over DMI (complexity is still generally on the order $O(N^3)$), it has the advantage that it may process new data incrementally as they arrive, e.g., as soon as a new row of matrix X arrives, all of $R_{xx}$, $R_{xx}^{-1}$, $r_{xs}$, w may be updated to incorporate the new training data. Each such individual training data update consumes $O(N^2)$ complex operations. While the update of $R_{xx}[n]$ and $r_{xs}[n]$ with x[n] (the $n^{th}$ row of X) may be accomplished via straightforward calculations in $O(N^2)$ operations, the update of $R_{xx}^{-1}[n]$ is obtained through a recursion formula called the Woodbury matrix identity, $$R_{xx}^{-1}[n] = (R_{xx}[n-1] + x[n]x[n]^H)^{-1} = \quad (7)$$
$$R_{xx}^{-1}[n-1] - R_{xx}^{-1}[n-1]x[n]x^H[n]R_{xx}^{-1}[n-1] / (1 + x^H[n]R_{xx}^{-1}[n-1]x[n]).$$

Equation 7, also known as the matrix inversion lemma, allows $R_{xx}^{-1}[n]$ to be computed from $R_{xx}^{-1}[n-1]$ and x[n] without having to perform an actual matrix inversion. Equation 7 may be implemented with only $O(N^2)$ complex operations.

Several variants of RLS are possible, some based on exponentially-weighted-averaging, and others based on sliding windows. The exponentially weighted average uses a positive real parameter $0 < \lambda \le 1$, called the forgetting factor, which is used to reduce the impact of old data on the weight estimate. When the forgetting factor is incorporated, the update equation for RX[n] assumes the form $$R_{xx}^{-1}[n] = (\lambda R_{xx}[n-1] + x[n]x[n]^H)^{-1} = \lambda^{-1} R_{xx}^{-1}[n-1] - \quad (8)$$
$$\lambda^{-2} R_{xx}^{-1}[n-1]x[n]x^H[n]R_{xx}^{-1}[n-1] / (1 + \lambda^{-1} x^H[n]R_{xx}^{-1}[n-1]x[n]).$$

The forgetting factor may be used for tracking variations in the channel if a sliding window is not used. There are also recursive versions of the MGSO implementation of DMI, known as RMGSO, that may provide enhanced numerical stability.

A straightforward means to implement STAP beamforming in the frequency domain is to divide the band into smaller subbands of $S_b$ subcarriers and solve the least-squares problem for each subband independently. This may be done for example with any of the outlined DMI-based or RLS-based algorithms. We refer to this as a rudimentary, or baseline, subbanding approach. Such an approach divides full signal bandwidth into K subbands and produces K separate beamformers, by solving K separate least-squares problems of size M×N independently. Therefore, the overall computational complexity may be described as $O(KN^3)$. This approach is attractive for its simplicity, and because it is easily parallelized across subbands, due to the fact that subbands are processed independently and do not share any data. The value of $S_b$ dictates the minimum number C of training symbols needed to achieve the required training TBP for the beamformer, as $C = 4N/S_b$, demonstrating the growth in training symbols with decreasing subband size. However, this baseline subbanding approach does not make maximum use of the training data, because it does not take advantage of the continuous nature of the frequency response of the wireless channel, particularly across the edges of the subbands. Hence each subband solution is suboptimal, especially for subcarriers at subband edges. For example, consider a subband size of $S_b$ subcarriers, such that subcarriers 0 to $S_b - 1$ are grouped into the first subband, subcarriers from $S_b$ to $S_b - 1$ are grouped into the second subband, and so forth. A shortcoming is evident in the fact that subcarrier $S_b$ is closest to subcarrier $S_b - 1$ in terms of channel response, and yet it is not included in the beamformer weight calculation for subcarrier $S_b - 1$. Hence, the performance of the STAP beamformer is best at the center of each subband, and starts to deteriorate toward subband edges. As a result, excess spatial degrees-of-freedom (DOF) are consumed by the STAP solution to achieve a flat response over the subband at the expense of interference cancelation, degrading the maximum overall achievable capacity of the system.

Accordingly, new techniques that make better use of the available training data and training TBP are needed, both to overcome performance degradations at subband edges, and to achieve deeper convergence at subband centers. It is desired that these techniques be parallelizable and have small computational and memory requirements.

Examples described herein to achieve improved performance over the baseline subbanding approach may be referred to as Weighted Overlap Beamform and Add (WOBA) methods. These WOBA methods may be applied to frequency-domain samples, e.g., FFT bins or subcarriers, to accomplish frequency-localized beamforming solutions. WOBA processing may take a variety of forms to accomplish greater frequency localization of the beamforming solution, hence closer adherence to the frequency-continuous theoretical solution, than the above-described baseline subbanding approach. An example WOBA method includes applying identical frequency-domain localizing operations to received training data and the known training sequence, such that there is minimal loss in their mutual information. Accordingly, while both data and training sequence may be deliberately distorted (e.g., by a weighting function) so as to achieve a desired frequency-localization objective, the identical nature of the distortion of these two inputs to the beamformer calculation (4) or (6) may render the distortion transparent to that equation, hence preventing the introduction of distortion-induced convergence losses that might otherwise occur (e.g., if their distortions differed). Examples of WOBA methods described herein include a subband-interpolating method, a recursive exponential averaging method, and a sliding-window method.

An example of a subband-interpolating WOBA method uses twice the number of subbands as the baseline subbanding approach, but in a fixed frequency-overlapping arrangement that retains the same $S_b$-subcarrier subband width as the baseline approach. For example, adjacent subbands may be overlapped such that the distance between adjacent subband centers is $[S_b/2]$ subcarriers, where [x] denotes rounding down to the largest integer less than or equal to x. As a convenience it may be assumed that each subband contains an even number of subcarriers, so that $S_b$ is an even number, although this is not a requirement. The least-squares beamformer training problem for each subband may then be solved independently, much like the baseline subbanding approach, but with a specialized modification. For example, training data subcarriers in each subband may first be multiplied by a tapered symmetric window (e.g., a triangular, Hamming, or Hanning window), yielding from the original received subband data matrix X a windowed subband data matrix $\tilde{X}$ that places reduced weighting on subcarriers that are farther away from subband centers, as $$\tilde{X}=GX \quad (9)$$

where G is a diagonal matrix of real, positive subband windowing weights $$G=\text{diag}(g_1, g_2, \ldots, g_N) \quad (10)$$

with the symmetry property that $g_N=g_1$, $g_{N-1}=g_2$, ..., and descending weights as distance increases from subband center, that is, $g_1 < g_2 < \ldots < g_{[N/2]}$. In addition, the known training sequence subcarrier values may be similarly multiplied by the same subband window function, yielding from the original known-waveform subband training sequence s a windowed subband training sequence $\tilde{s}$ as $$\tilde{s}=Gs. \quad (11)$$

The identical windowing of the received subband data $\tilde{X}$ and the known-waveform subband training sequence $\tilde{s}$ prevents least-squares (or other adaptive algorithm) convergence losses that may otherwise be caused by a mismatch between waveform $\tilde{s}$ and its presence in $\tilde{X}$. The STAP beamformer weight vector $v_i$ for a given WOBA subband i has the same form as the baseline subbanding approach in (4), simply replacing X and s in (4) with their windowed versions, as $$v_i=(\tilde{X}^H\tilde{X})^{-1}(\tilde{X}^H\tilde{s}). \quad (12)$$

The solution (12) represents a windowed least-squares (WLS) beamformer training solution to the original LS problem described by (4) or equivalently (6), where the subband weighting function is provided by the windowing weights $g_i$. The reduced weighting of training data subcarriers toward subband edges deepens WOBA subband beamformer convergence in frequency-varying channels by centrally localizing the solution, producing a narrower effective weighted-bandwidth subband. A non-windowed variant, yielding a basic least-squares beamformer solution, may be achieved by utilizing a rectangular window, e.g., a window having no amplitude roll-off to either side of subband center, in which case $g_1=g_2=\ldots=g_N=1$. The WLS solution may be implemented using any DMI or RLS-based method applied to the windowed subband data $\tilde{X}$.

In the event that multiple training symbols are in use to meet the training TBP requirement, the subband windowing matrix G may be applied to each training symbol's array data and training sequence in accordance with (9) and (11), after which the windowed data matrices and training sequence vectors are each may be merged in consistent indexing fashion to produce a respective joined inputs to equation (12). The order of indexing has no effect on the resultant beamformer weights, hence simple abutting of the respective windowed data matrices and training sequence vectors as inputs to (12) suffices as a straightforward method in some examples.

After the WOBA beamformer has been generated in the training sequence portion of the frame according to (12), processing proceeds to the payload section of the frame. Let $v_i$ be the LS or WLS WOBA beamformer weights obtained for subband i, referred to henceforth as the intermediate weight vector for subband i. Then the beamforming weight vector $w_j$ for payload subcarrier j that lies in overlapping subbands i and i+1 is generated as a convex linear combination of intermediate weight vectors $v_i$ and $v_i+1$ as $$w_j = (1-\alpha)v_i + \alpha v_{i+1} \quad (13)$$

where $$\alpha = \min\left(2\frac{d_{ji}}{s_b}, 1\right) \quad (14)$$

where $d_{ji}$ is the distance (e.g., a number of subcarriers) between subcarrier j and the center of subband i. The beamformer weight vector $w_j$ is then applied to the non-windowed subcarrier j array data for all payload symbols in the frame. Accordingly, the WOBA beamforming solution (13) performs a pointwise frequency interpolation between adjacent subbands at each subcarrier, thereby better approximating the desired continuous theoretical STAP solution across frequency than the baseline subbanding approach.

An example subband-interpolating WOBA embodiment utilizes a triangular training window complementary to the interpolation function (13), in which the window weightings $g_k$ are given by $$g_k = 1 - \min\left(2\frac{d_{ctr,k}}{s_b}, 1\right) \quad (15)$$

where $d_{ctr,k}$ is the distance (e.g., a number of subcarriers) of subcarrier k from the center of the subband to which the window is being applied. More generally, the WOBA windowing function may be any apodization function, including (as non-limiting examples) triangular, polynomial, Gaussian, uniform, Hamming, Hanning, Blackman, sine/cosine, Welch, and Nuttal. Some such choices may produce a frequency-domain amplitude ripple with a period equal to the subband size, whereas others, such as triangular-window WOBA in (15), may not.

The two subbands at the band lower and upper edges may receive special handling in some examples. The absence of a neighboring subband at either edge deprives the outer subcarriers (those within $S_b/2$ or fewer subcarriers from the edge) of a combinable adjacent-subband weight vector. As a result, the weight interpolation formula (14) cannot be applied without incurring an increasing downward bias in the beamformer output with decreasing distance from the band edge. A straightforward processing to prevent or reduce these band-edge biases is to force the value of a in (14) to $\alpha=0$ for these outer subcarriers, thus forcing the use of the outer-subband weights $v_i$ without modification for beamforming such subcarriers.

The additional implementation cost of this WOBA example may be roughly a doubling in computation and memory requirements in some examples, relative to the baseline (non-WOBA) subbanding approach (e.g., twice the number of subbands requires twice the number of least-squares problems). Parallelization of WOBA may be as straightforward as for the baseline subbanding approach.

Some examples of WOBA may utilize recursive exponential averaging to achieve frequency localization and continuity objectives. A recursive exponential averaging WOBA example may place greater beamformer training weighting on training subcarriers near a given subcarrier, and exponentially decaying weighting on more distant training subcarriers in accordance with their distance away from that given subcarrier. A recursive exponential averaging WOBA method may not utilize the concept of subbands, but rather may start at one end of the full operating band, and proceed in single-subcarrier steps across the band to the opposite end. It should be noted that this method, unlike some examples of subband-interpolating methods and sliding-window methods described herein, may not place symmetrical training weighting on subcarriers to either side of a given subcarrier. Rather examples of this method may place increased (e.g., maximum) training weight on a current subcarrier, and exponentially decaying training weight on previous subcarriers as they slide into the past.

An example implementation of a recursive exponential averaging WOBA method utilizes a parameter referred to as a forgetting factor or forget factor. The forgetting factor may be a positive real parameter $0<\lambda\leq1$. A forgetting factor is selected based on the expected rate of frequency variation of the channel. A larger value may be used for low rates of variation (e.g., small changes from one subcarrier to the next), whereas a smaller value may be used for high rates of variation. If $S_b$ subcarriers of averaging are desired (e.g., corresponding to an effective subband size of $S_b$), then $\lambda$ should be set to a value of $$\lambda=(CS_b-1)/(CS_b+1), \quad (16)$$

where C is the number of training symbols in use. As with other beamformers, the value of $S_b$ above may dictate the minimum number C of training symbols used to achieve the required training TBP for the beamformer, which is given by $C=4N/S_b$. The update to $r_{xs}[j-1]$ is generated at the jth subcarrier by stepping through the training symbols for that subcarrier, as $$b[0] = r_{xs}[j-1] \quad (17)$$
$$b[c] = \lambda b[c-1] + x_{j_c}^H s_{j_c}, c = 1, \ldots, C$$
$$r_{xs}[j] = b[C]$$

where $j_c$ indexes the jth subcarrier of training symbol c, $s_{j_c}$ is the training sequence value (complex scalar) for the jth subcarrier of training symbol c, and $x_{j_c}$ is the row vector corresponding to the subcarrier j training symbol c array data vector. Similarly, the update to $R_{xx}^{-1}[j-1]$ may be generated at the jth subcarrier as $$B^{-1}[0] = R_{xx}^{-1}[j-1] \quad (18)$$
$$B^{-1}[c] = F_{RLS,\lambda}\{B^{-1}[c-1], x_{j_c}\}, c = 1, \ldots, C$$
$$R_{xx}^{-1}[j] = B^{-1}[C]$$

where $F_{RLS,\lambda}\{B^{-1}, x\}$ is the exponential averaging RLS equation (8) for input inverse covariance matrix $B^{-1}$ and data vector x. The training symbols are assumed numbered in the order received, in which case (18) places more weight on the later-arriving, hence more current, training symbols. The terms $r_{xs}[j]$ and $R_{xx}^{-1}[j]$ as produced by (17) and (18) may then be substituted into (6) to produce the beamforming weight vector $w_j$ for subcarrier j. The beamformer weight vector $w_j$ may then be applied to the subcarrier j array data for all payload symbols in the frame.

A forward-backward extension to recursive exponential averaging WOBA methods may be implemented in some examples. Examples utilizing the forward-backward extension may in some examples achieve symmetrical training weighting on subcarriers to either side of a given subcarrier. As the name implies, this method may execute two recursive exponential averaging WOBA passes on the training symbols, one starting at a lower end of a processing band and proceeding in the direction of increasing frequency to produce forward-pass beamforming weights $w_{j,forward}$, and the other starting at an upper end of the processing band and proceeding in the direction of decreasing frequency to produce backward-pass beamforming weights $w_{j,backward}$. Then beamforming weights are generated for each subcarrier j by combining the beamforming weights obtained in both bpassed. For example, a simple averaging of these passes may be used, as given by $$w_j=(w_{j,forward}+w_{j,backward})/2. \quad (19)$$

The beamformer weight vector $w_j$ is then applied to the subcarrier j array data for all payload symbols in the frame.

It should be noted that this beamformer weight-averaging solution may not be mathematically equivalent to computing the terms $r_{xs}[j]$ and $R_{xx}^{-1}[j]$ and resultant $w_j$ over an equivalent symmetric or two-tailed exponential weighting function centered on each j in the fashion of a sliding training window, examples of which are described herein. However the approximation presented in (19) may be effective in many applications, as it may rarely depart significantly from the latter solution, and in itself represents a valid criterion for beamformer adaptation. An advantage to both basic and forward-backward recursive exponential averaging WOBA methods is that they may be less computationally intensive than other WOBA methods described herein, such as examples utilizing a sliding training window.

Some examples of WOBA methods may utilize a sliding window (e.g., a sliding training window). The window may be an $S_b$-subcarrier sliding subband, which may be used in lieu of fixed subbands described herein. Accordingly, similar frequency localization and continuity objectives of per-subcarrier beamformer weights may be achieved. Example methods utilizing a sliding window may begin at either band-edge, and an initial inverse covariance matrix $R_{xx}^{-1}[j_o]$ and initial cross-correlation vector $r_{xs}(j_o)$ may be generated over $S_b$ subcarriers using a DMI, RLS, or RMGSO, or other method as desired, and substituted into equation (6) to obtain an initial beamformer weight vector $w_{j_o}$, much like the baseline subbanding approach. For example, if the initial subband is taken as the first (e.g., lowest-frequency) subband in a full processing bandwidth, then $j_o$ would correspond to the center subcarrier of that subband, that is, $j_o=[S_b/2]$. The sliding window may then step across the band one subcarrier j at a time (or using another interval in other examples), beginning with the first subcarrier step $j=j_o+1$ beyond the center of the initialization subband. At each step, equations (9) through (12) may be computed anew in the training section of the frame to produce beamforming weights for the centered subcarrier for that step (e.g., for that position of the window). It may be advantageous to utilize an odd number for $S_b$ in order to ensure centering on the indexed subcarrier, although the criticality of doing so diminishes with increasing $S_b$. The weight vector $w_j$ for payload subcarrier j may then be given by $v_j$ in (12) by setting $w_j=v_j$. This method ensures that only $S_b$ nearest neighbors of each subcarrier are involved in the weight computation for that subcarrier. Each such $w_j$ is then used to beamform subcarrier j of each payload symbol in the frame.

In executing the above described method, the total number of arithmetic operations may increase by a factor of $S_b$ relative to the baseline (e.g., non-WOBA) subbanding approach. This extra factor can be reduced by using a recursive algorithm such as recursive least squares (e.g., RLS, see equation (7)) or RMGSO. In either case, the recursive algorithm would implement a rectangular sliding window (e.g., all $g_i=1$), with a window size of $CS_b$, where C is the number of training symbols. For the case of multiple training symbols C>1, the weights for subcarrier j may be computed using (6) after first performing the following C incremental subcarrier additions and subtractions to each term $R_{xx}^{-1}$ and $r_{xs}$. At each sliding step of the window both terms $R_{xx}^{-1}$ and $r_{xs}$ may be down-dated to remove the contribution from the exiting subcarrier of each training symbol, and then updated to assimilate the newly entering subcarrier of each training symbol. The combined update and down-date to $r_{xs}$ is given at the jth sliding step by $$r_{xs}[j]=r_{xs}[j-1]+X_{entering}^H s_{entering}-X_{exiting}^H s_{exiting}, \quad (20)$$

where $s_{entering}$ and $s_{exiting}$ are respective new-subcarrier and exiting-subcarrier training sequence values, complex scalar if C=1, or C-vectors when multiple training symbols are involved (C>1), and $X_{entering}$ and $X_{exiting}$ are respective new-subcarrier and exiting-subcarrier training data vectors (if C=1) or matrices (if C>1). The additive and subtractive terms in (16) are referred to as updates and down-dates, respectively. Comparably, for each training symbol, the $R_{xx}^{-1}[j-1]$ term is first down-dated for exiting-subcarrier training data vectors and then updated for entering-subcarrier training data vectors using respective recursive rank-1 down-dates $\mathcal{R}_{(-)}$ and updates $\mathcal{R}_{(+)}$ as $$D^{-1}[0] = R_{xx}^{-1}[j-1] \quad (21)$$
$$D^{-1}[c] = \mathcal{R}_{(-)}\{D^{-1}[c-1], x_{C-c+1,exiting}\}, c = 1, \ldots, C$$
$$U^{-1}[0] = D^{-1}[1]$$
$$U^{-1}[c] = \mathcal{R}_{(+)}\{U^{-1}[c-1], x_{c,entering}\}, c = 1, \ldots, C$$
$$R_{xx}^{-1}[j] = U^{-1}[C]$$

to yield the step j inverse covariance matrix $R_{xx}^{-1}[j]$, where $x_{c,entering}$ and $x_{c,exiting}$ are respective new-subcarrier and exiting-subcarrier training data vectors for training symbol c. In the above, the down-date process may be executed in the reverse of the order in which the training symbols were originally entered into the sliding window $S_b$ subcarriers into the past. Down-date function $\mathcal{R}_{(-)}$ and update function $\mathcal{R}_{(+)}$ may represent respective rank-1 down-dates and updates of RLS, RMGSO, or any other method of recursive matrix inversion. The terms $r_{xs}[\ ]$ and $R_{xx}^{-1}[j]$ as produced by (20) and (21) may then be substituted into (6) to produce the beamforming weight vector $w_j$ for subcarrier j. The beamformer weight vector $w_j$ is then applied to the subcarrier j array data for all payload symbols in the frame.

The memory and computational requirements of such a recursive sliding-window beamformer training method based on an RLS, RMGSO, or similar recursion may be evaluated as follows. Memory is used to retain past versions of $R_{xx}^{-1}[j]$ going back $S_b$ subcarriers into the past, corresponding at each step j to a set of C N×N matrices $\{R_{xx}^{-1}[j]_{(1)}, \ldots, R_{xx}^{-1}[j]_{(C)}\}$, one for each of C training symbols, for a total of $CS_b$ such matrices. These C inverse covariance matrices support the RLS, RMGSO, or similar recursive down-date required at each step j. Similarly, the set of $S_b$ past C×N training data matrices $X_j$ support the RLS (or RMGSO) down-date. Computationally and theoretically, the cost of down-dating and updating at each step j is $O(N^2)$ for $R_{xx}^{-1}[j]$ and O(N) for $r_{xs}(j)$. The theoretical computational cost of the beamformer $w_j$ calculation (6) at each step j is $O(N^2)$. Hence, the total theoretical computational complexity of such a recursive sliding-window implementation across a subband-size set of subcarriers is $O(MN^2)$, similar to the baseline (non-WOBA) subbanding approach.

Examples described herein may provide frequency-localized beamformer weights. Frequency or subband localization generally refers to a beamforming solution which may be particular to (e.g., calculated for use at) a particular frequency and/or frequency range (such as a subband). In some examples, systems and methods described herein provide a different beamformer (e.g., different beamformer weights) at each subcarrier and/or group of subcarriers. A subcarrier generally refers to a frequency unit (e.g., a minimum frequency unit), such as a single frequency-domain sample or FFT bin. A subband may include multiple subcarriers, for example, a subband may include a number of subcarriers over which a channel may be considered flat. The channel may be considered flat over a set of subcarriers when utilizing a same beamforming weight vector for the set of subcarriers provides adequate performance.

Figure 5:
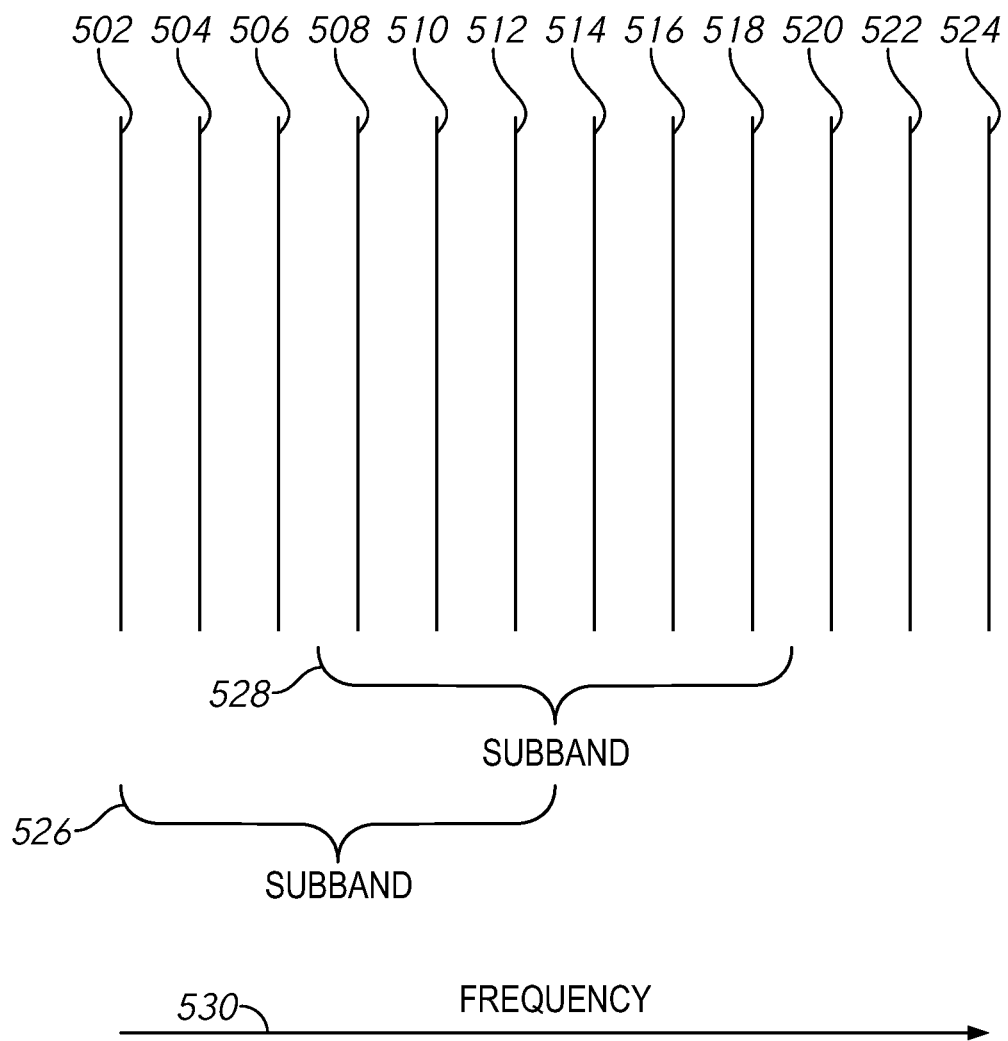
FIG. 5 is an illustration of subcarriers grouped into subbands in accordance with an example WOBA technique described herein

FIG. 5 is an illustration of subcarriers grouped into subbands in accordance with a WOBA technique. The example of a WOBA method illustrated in FIG. 5 may be referred to as a subband-interpolating method. FIG. 5 illustrates twelve subcarrier frequencies. The subcarriers are illustrated as vertical lines along a frequency axis 530. To implement a WOBA technique, overlapping subbands may be used. A subband generally refers to a range of frequencies. In some examples, a subband may correspond to multiple contiguous FFT bins of signals. For example, a first subband 526 may include the subcarriers 502, 504, 506, 508, 510, and 512. These subcarriers may be weighted by a window function having a maximum amplitude at subband center and symmetric amplitude roll-off to either side of center. A non-windowed variant may be achieved by forgoing use of a window and/or utilizing a rectangular window, having no amplitude roll-off to either side of subband center.

A beamforming network (e.g., a STAP beamformer having a weight processor) may calculate weights for the subband 526 (which may be a weighted subband, with individual subcarriers and/or groups of subcarriers weighted in accordance with a window), such as by finding a LS, WLS, or other solution. The beamforming weights for the subband 526 may be referred to as intermediate weights. A second subband 528 may overlap with the subband 526—e.g., certain subcarriers may be in both the subband 526 and 528. The subband 528 includes subcarriers 508, 510, 512, 514, 516, and 518. Accordingly, subcarriers 508, 510, and 512 may be in both the subband 526 and the subband 528. The second subband 528 may apply a same or different window function centered on its subcarriers 508 through 518, as used by subband 526 on its respective subcarriers. Further overlapping subbands may also be used. Weights may be calculated for the subband 526 (e.g., using a least-squares solution or a windowed least-squares solution). A least-squares solution which is calculated or otherwise provided using weighted subcarriers within a subband (e.g., weighted in accordance with a window) may be referred to as a windowed least-squares (WLS) solution. Weights (e.g., intermediate weights) may also be calculated for the subband 528. The final weights utilized by a beamformer for a particular subcarrier may be a combination of the intermediate weights calculated for each of the subbands in which the particular subcarrier participates. For example, the weights for the subcarrier 512 may be a combination of the intermediate weights generated for the subband 526 and the intermediate weights generated for the subband 528. Any of a variety of combinations may be used (e.g., averages, sums, linear interpolation). In making the combination, the intermediate weights may be weighted in accordance with a distance between the particular subcarrier and the center of the subband. In the example of FIG. 5, in calculating weights for the subcarrier 512, the intermediate weights for subband 528 may be weighted more heavily than the intermediate weights for subband 526 when combining the intermediate weights to calculate final weights. This is because the subcarrier 512 is at or near the center of the subband 528, and the subcarrier 512 is at or near an edge of the subband 526. The weight given to a subband's intermediate weights may be proportional to a distance between the particular subcarrier and the center of the subband. While the subcarrier 512 is illustrated as participating in two overlapping subbands, any number of overlapping subbands may be used in other examples.

Figure 7:
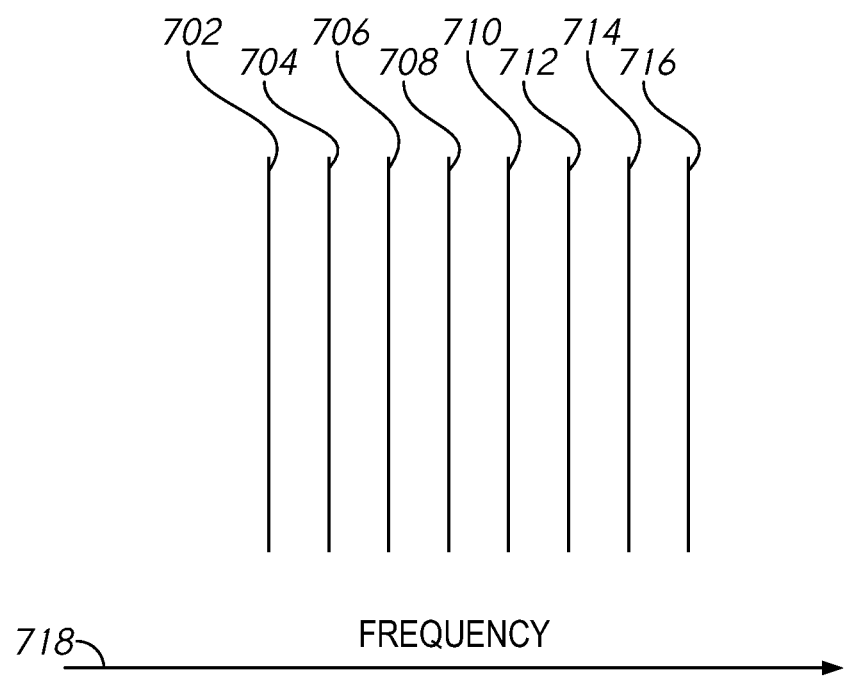
FIG. 7 is a schematic illustration of subcarriers utilized in an example of a recursive exponential averaging WOBA method, arranged in accordance with examples described herein.

FIG. 7 is a schematic illustration of subcarriers utilized in an example of a recursive exponential averaging WOBA method. A number of subcarriers are shown—subcarriers 702-716. The subcarriers generally represent a particular frequency unit, e.g., an FFT bin. The subcarriers in FIG. 7 are shown in order along a frequency axis 718 shown pointing in a direction of increasing frequency. In examples described herein, weights to be used to process a particular subcarrier may be calculated during a training phase. The weights for a particular subcarrier may be calculated using weighted contributions of weights or other components previously calculated for one or more other subcarriers. In some examples, the contributions of other subcarriers may be weighted in accordance with their distance from the subcarrier whose weights are being calculated. In some examples, there may be an exponential decay in the weighting of the subcarrier contribution as the subcarrier gets further away from the subcarrier of interest. For example, during a training phase, weights may be calculated for the subcarriers shown in FIG. 7 in frequency order—e.g., first for the subcarrier 702, next for the subcarrier 704, next for the subcarrier 706, next for the subcarrier 708, next for the subcarrier 710, next for the subcarrier 712, next for the subcarrier 714, next for the subcarrier 716.

Considering as an example the calculation of weights for the subcarrier 712, an update to a cross-correlation vector (e.g., $r_{xs}$) may be calculated for the subcarrier 712. The update to the cross-correlation vector may be calculated using a weighted contribution from the subcarrier 710. For example, the cross-correlation vector calculated or otherwise obtained for use with the subcarrier 710 may be weighted (e.g., using a forgetting factor described herein) and used to obtain the updated cross-correlation vector for the subcarrier 712 (e.g., in accordance with Equation 17 described herein). Additionally or instead, an inverse covariance matrix (e.g., $R_{xx}^{-1}$) may be calculated for use in determining weights for the subcarrier 712. The inverse covariance matrix may be calculated as an update to the inverse covariance matrix calculated for a previous subcarrier (e.g., for subcarrier 710). The inverse covariance matrix for the subcarrier 710 may be weighted (e.g. in accordance with a forgetting factor described herein) and used to generate the updated covariance matrix for the subcarrier 712. Note that a similar process may be performed for each subcarrier—e.g., the process is recursive. In this manner, when calculating weights for the subcarrier 714, weighted contributions of the cross-correlation vector and/or covariance matrix calculated for the subcarrier 712 may be used. As described, those components as calculated for the subcarrier 712 themselves utilized weighted contributions from components calculated for the subcarrier 710. Accordingly, by weighting a component (e.g., a cross-correlation vector and/or an inverse covariance matrix) associated with the subcarrier 712 by a forgetting factor, it may include a weighted contribution from the subcarrier 710 weighted by a square of the forgetting factor. Of course, the components used for the subcarrier 710 may have been calculated in an analogous manner (e.g., based on a weighted contribution from the subcarrier 708), and accordingly, the components calculated for the subcarrier 714 may include a contribution from the subcarrier 708 weighted by a cube of the forget factor.

Once a cross-correlation vector and/or an inverse covariance matrix have been calculated for a particular subcarrier, they may be used to calculate a solution for the subcarrier (e.g., weights for the subcarrier). For example, Equation (6) may be used to obtain the weights from the inverse covariance matrix and/or cross-correlation vector calculated for a particular subcarrier.

While seven subcarriers are shown by way of example in FIG. 7, any number may be used in other examples. While an example has been described of recursively calculating weights for subcarriers by traversing the subcarriers in a direction of increasing frequency, utilizing weighted contributions from components of solutions for subcarriers having lower frequencies, in other examples other traversing patterns may be used. For example, weights for a particular subcarrier may be calculated using weighted contributions of components of solutions for subcarriers having higher frequencies in an analogous manner.

In some examples a forward and backward method may be used. For example, weights may be calculated for the subcarrier 712 as described above, utilizing contributions from solutions for subcarriers having lower frequencies. In addition, weights may also be calculated for the subcarrier 712 by a process which traverses the subcarriers in an opposite direction of that depicted by the axis 718. For example, weights may be calculated for the subcarrier 712 using weighted contributions from calculations for the subcarriers 716 and 718. For example, an updated cross-correlation vector may be calculated for the subcarrier 712 using the cross-correlation vector calculated for the subcarrier 716 weighted by the forgetting factor, which may in turn have utilized the cross-correlation vector calculated for the subcarrier 718 weighted by the forgetting factor. Similarly, an updated inverse covariance matrix may be calculated for the subcarrier 712 using the inverse covariance matrix calculated for the subcarrier 716 weighted by the forgetting factor, which may in turn have utilized the inverse covariance matrix calculated for the subcarrier 718 weighted by the forgetting factor. Weights for the subcarrier 712 may be calculated using the updated cross-correlation vector and updated inverse covariance matrix. In this manner, one set of weights (e.g., a forward set of estimated weights) may be calculated for the subcarrier based on traversing the subcarriers in a first direction (e.g., increasing in frequency). Another set of weights (e.g., a backward set of estimated weights) may be calculated for the subcarrier based on traversing the subcarriers in a second direction (e.g., decreasing in frequency). The two sets of weights may be combined to yield a final set of weights. Generally, any combination may be used, including averaging, weighted averaging, summing and/or normalizing. Additionally, while sequential traversing has been described (e.g., subcarrier solutions may be calculated based on weighted contributions from an adjacent subcarrier), contributions from non-sequential subcarriers may be used in some examples. For example, contributions from every other subcarrier and/or every third subcarrier may be used in some examples.

Figure 8:
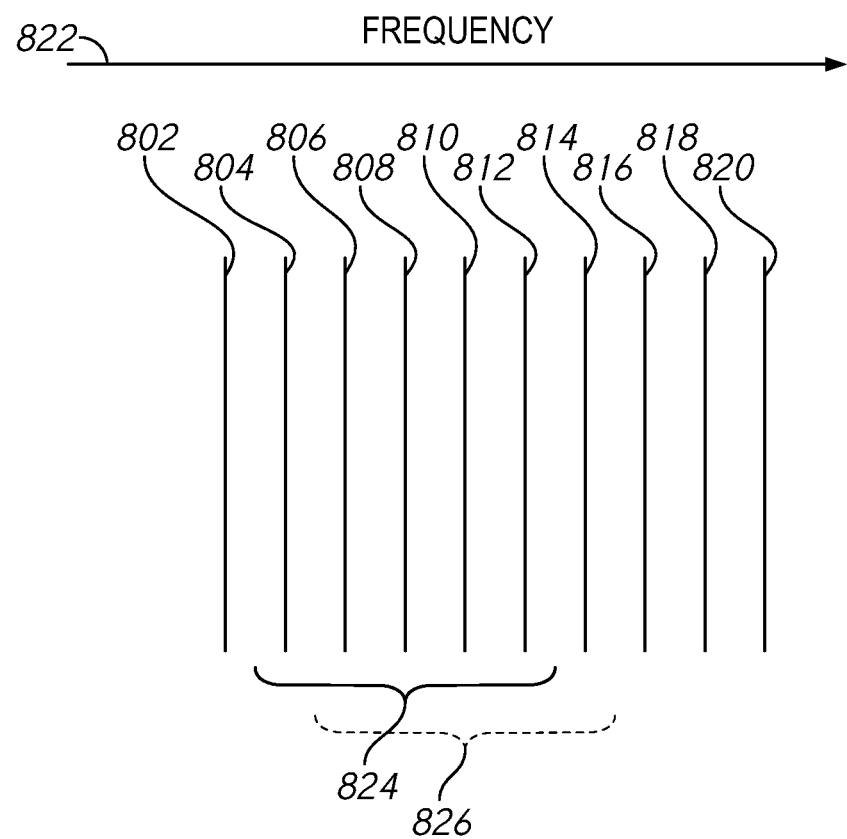
FIG. 8 is a schematic illustration of subcarriers utilized in an example of a sliding window WOBA method, arranged in accordance with examples described herein.

FIG. 8 is a schematic illustration of subcarriers utilized in an example of a sliding window WOBA method, arranged in accordance with examples described herein. A number of subcarriers are shown—subcarriers 802-820, although other numbers of subcarriers may be used in other examples. The subcarriers are depicted along an axis of increasing frequency, as indicated by axis 822. A window 824 is shown at a particular position. In the example of FIG. 8, the window 824 has a frequency width that encompasses five subcarriers. In other examples, other widths may be used. As depicted in FIG. 8, the window 824 includes subcarrier 804, subcarrier 806, subcarrier 808, subcarrier 810, and subcarrier 812. The five subcarriers in window 824 may be used to calculate weights (e.g., determine a least squares solution) for the subcarrier 808 (e.g., a middle subcarrier in the window 824). In some examples, the weights may be used for multiple subcarriers within the window (e.g., for subcarriers 806, 808, and 810). During a sliding window WOBA method, a window worth of subcarriers may be used to calculate weights for each subcarrier. So, for example, weights for the subcarrier 808 may be calculated using the subcarriers 804, 806, 810, and 812. Weights for a next subcarrier (e.g., 810) may be calculated using a window's worth of subcarriers, where the window is shifted by a subcarrier from the position used to calculate the weights for the subcarrier 808. For example, the window 826 in FIG. 8 illustrates a position of a window which may be used to calculate weights for the subcarrier 810. The window 826 is a same width as the window 824, but is shifted one position to the right (e.g., one subcarrier of increased frequency) with respect to the window 824. In moving the window from the position of window 824 to the position of the window 826, the subcarrier 804 has been dropped (e.g., is not included in the window 826) and the subcarrier 814 has been added (e.g., had not been included in the window 824). In some examples, the window width may be equal to a width of a subband. While an example of the window moving in an increasing frequency direction has been described (e.g., from window 824 to window 826), some examples may utilize transitions of the window in a decreasing frequency direction (e.g., the opposite direction as shown in FIG. 8).

To perform a sliding window method, weights and/or components used to calculate weights may be calculated at an initial window position, such as the position of window 824 of FIG. 8. For example, an initial inverse covariance matrix $R_{xx}^{-1}[j_o]$ and initial cross-correlation vector $r_{xs}(j_o)$, may be generated over the subcarriers in the window 824 (e.g., subcarriers 804, 806, 808, 810, and 812) using a DMI, RLS, or RMGSO, or other method as desired.

The cross-correlation vector and inverse covariance matrix may be used to obtain weights, e.g., using equation (6). Those weights may be the weights for certain of the subcarriers in that window position (e.g., the center subcarrier, subcarrier 808).

Weights for a next subcarrier may be calculated using a different window position (e.g., window 826). In some examples, an inverse covariance matrix and/or cross-correlation vector may be generated over the subcarriers in the window 826 in an analogous manner as described for the window 824. The cross-correlation vector and inverse covariance matrix may be used to obtain weights, e.g., using equation (6). Those weights may be the weights for certain of the subcarriers in that window position (e.g., the center subcarrier, subcarrier 810).

In some examples, weights for a next subcarrier may be calculated by updating a previously-calculated cross-correlation vector and/or inverse covariance matrix. For example, a recursive algorithm, such as RLS, may be used. For example, an updated cross-correlation vector may be calculated for the window 826 based on the cross-correlation vector for the window 824 (see, e.g., Equation 20). The cross-correlation vector may be updated by adding a contribution for the entering subcarrier and subtracting a contribution for the leaving subcarrier. The entering subcarrier may be a subcarrier included in the current window position but absent from the previous window position. The leaving subcarrier may be a subcarrier present in the previous window position but absent from the current window position. In an analogous manner, an updated inverse covariance matrix may be calculated for the window 826 based on the inverse covariance matrix for the window 824 (see, e.g., Equation 21). The inverse covariance matrix may be updated using recursive updates associated with the entering subcarrier(s) and recursive down-dates associated with the existing subcarrier(s). The updated cross-correlation vector and updated inverse covariance matrix may be used to generate weights associated with one or more subcarriers in the new window position (e.g., for subcarrier 810 in window 826 of FIG. 8). For example, Equation 6 may be used to provide the weights.

Figure 6:
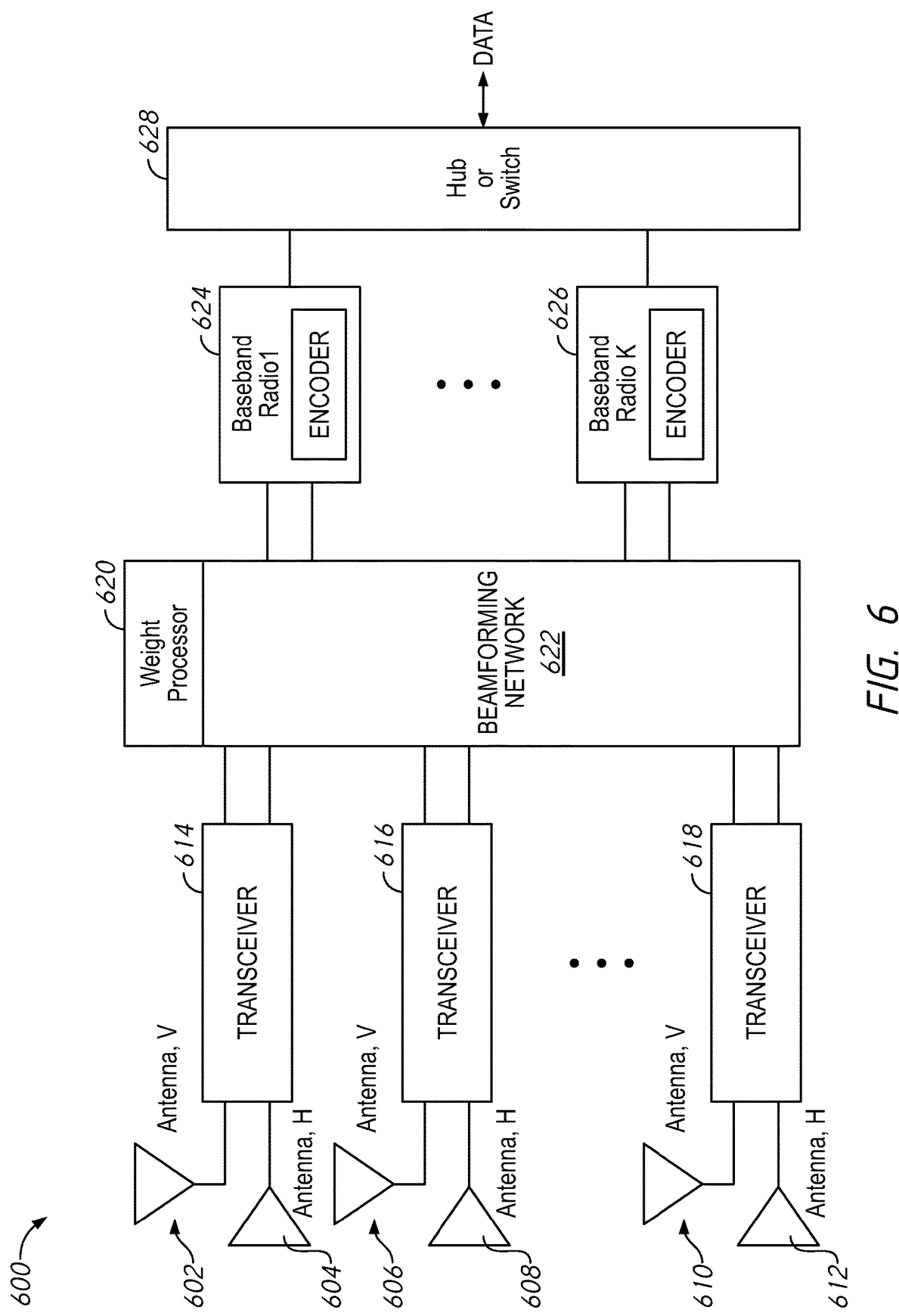
FIG. 6 is a schematic illustration of a system arranged in accordance with examples described herein.

FIG. 6 is a schematic illustration of a system arranged in accordance with examples described herein. The system 600 includes multiple transceivers—including transceiver 614, transceiver 616, and transceiver 618. Each transceiver is depicted with two antennas. The transceiver 614 is coupled to antenna 602 and antenna 604. The transceiver 616 is coupled to antenna 606 and antenna 608. The transceiver 618 is coupled to antenna 610 and antenna 612. The transceivers are coupled to beamforming network 622. The beamforming network 622 includes weight processor 620. Multiple baseband radios are coupled to beamforming network 622—including baseband radio 624 and baseband radio 626. The baseband radios are depicted as including encoders, and the baseband radios may additionally or instead include decoders. The baseband radios are coupled to switch 628 which may provide and/or receive data. The components shown in system 600 of FIG. 1 are exemplary. Additional, fewer, and/or different components may be used in other examples.

Examples of systems described herein, such as system 600 of FIG. 6, may be incorporated into and/or otherwise used to implement one or more wireless communication devices. Examples of wireless communication devices include base stations, routers, access points, cells, computers (e.g., servers) as well as remote nodes of a wireless network and/or mobile devices such as tablets, handsets (e.g., cellular phones), and laptops. Examples of wireless communication devices further include other devices having incorporated communication technology such as televisions, set-top boxes, gaming devices, home automation devices, appliances, and automobiles or other vehicles. Multiple systems described herein, including multiple instances of system 600 of FIG. 6, may be deployed in a communication environment. For example, the system 600 may be used to implement one or more mobile communication devices (e.g., handsets) and/or residential units (e.g., routers) which may communicate with one or more base stations in a communication environment, where the base stations may also include an example system described herein (e.g., system 600 of FIG. 6).

Examples of systems described herein include transceivers (e.g., wireless communication transceivers), such as transceiver 614, transceiver 616, and transceiver 618 of FIG. 6. Transceivers generally may include both transmitter and receiver components and/or share circuitry used to perform transmitting and receiving. In some examples, a transceiver may include separate transmitter and receiver components. While three transceivers are provided with reference numbers in FIG. 6, any number may be included in the system (as indicated by the three dots in FIG. 6). For example, 1, 2, 3, 4, 5, 6, 7, 8, 9, 10, 16, 32, 64, 128, and/or other numbers of transceivers may be used in other examples. Transceivers used in FIG. 6 may include cancellation circuitry in some examples. The transceivers may each provide a data stream corresponding to RF signals incident on and/or transmitted by the antenna(s) to which they are connected. The data stream may be, for example, a discretized version of the RF signals incident on one or more antenna(s). One or more data streams may include training data which may be used (e.g., by a weight processor) to generate the weights in accordance with techniques described herein.

Examples of transceivers may be coupled to antennas. For example, transceiver 614 is depicted coupled to antenna 602 and antenna 604. Transceiver 616 of FIG. 6 is depicted coupled to antenna 606 and antenna 608. Transceiver 618 of FIG. 6 is depicted coupled to antenna 610 and antenna 612. Generally, multiple antennas coupled to a single transceiver may each be used to (e.g., tuned to) receive a particular polarization (e.g., indicated by 'Antenna V' and 'Antenna H' in FIG. 6. In some examples, one or more transceivers may be coupled to only a single antenna. Radio frequency (RF) signals may be incident on and/or transmitted by antennas described herein. Generally, the RF signals may be received in a frequency band that may include multiple subcarrier frequencies.

The system 600 may include one antenna and/or may include multiple antennas—e.g., the system 600 may be a multiple antenna system, otherwise referred to as a multiple-input multiple-output (MIMO) system. In this manner, any number of antennas may be provided in systems described herein, such as 1, 2, 3, 4, 5, 6, 7, 8, 9, 10, 16, 32, 64, 128, 256, or other number of antennas. Multiple antennas provided in a system (e.g., in a mobile communication device) may be referred to as an antenna array. The antenna array may be local to one device (e.g., the antennas may be provided in a same device), or the antenna array may be distributed in some examples. For example, the antennas shown in FIG. 6 may be included in separate devices distributed about an environment in some examples. Transceivers in communication with the distributed antennas may be in communication with one another and/or with a beamforming network to facilitate techniques described herein.

Examples of systems described herein may include a beamforming network (e.g., one or more beamformers), such as beamforming network 622 of FIG. 6. The beamforming network may be used to provide the signal to be transmitted by each of the multiple transceivers and/or antennas of the system (e.g., system 600 of FIG. 6). The beamforming network may additionally or instead be used to combine signals received at multiple antennas to form a received signal. The beamforming network 622 may include a weight processor 620, which may be used to calculate weights for each of the transceivers and/or antennas in the system. Generally, beamforming networks may be implemented using one or more processors (e.g., central processing unit(s) (CPUs), microprocessors etc.), which may execute instructions stored in one or more computer readable media, and/or circuitry for performing computations (e.g., field programmable gate array (FPGA) circuitry and/or application specific integrated circuits (ASICs)).

Beamforming networks described herein and utilized in devices and/or systems herein may include one or more weight processors, such as weight processor 620 of FIG. 6. The weight processor 620 may be used to calculate weights to be used by beamforming network 622 to generate signals for transmission by multiple antennas in the system 600 and/or to combine signals received by multiple antennas in the system 600. Accordingly, such a beamforming network 622, may receive data streams from one or more transceivers and may calculate, for each subcarrier of a frequency band, a respective plurality of weights used to generate signals for transmission by or combine the signals received at respective ones of the plurality of antennas. In some examples, the beamforming network 622 may receive a representation of one or more of the data streams. For example, data streams may be received at multiple antennas, and the system 600 may transform the datastreams (e.g., using an FFT) to provide representation of the data streams in the frequency domain to the beamforming network 622. The weight processor may accordingly be used to implement the WOBA methods described herein, including overlap and add methods (e.g., as described with reference to FIG. 5) or recursive exponential methods (e.g., as described with reference to FIG. 7), or sliding window methods (e.g., as described with reference to FIG. 8).

Examples of systems described herein include one or more baseband radios, such as baseband radio 624 and baseband radio 626 of FIG. 6. The baseband radios may modulate data intended for transmission by the system and/or de-modulate data intended for reception by the system. The baseband radios may accordingly include one or more encoders and/or decoders (although only encoders are depicted in FIG. 6). Although two baseband radios are depicted in FIG. 6, any number may be used. The baseband radios may modulate data to be transmitted and/or demodulate signals received by the system 600. Any of a variety of schemes may be used by the baseband radios to modulate and/or demodulate the data.

Examples of systems described herein may include a hub or switch, such as switch 628 of FIG. 6 that may provide demodulated data to and/or from the baseband radios. In this manner RF signals incident on the antennas may generally be converted into received data and/or data provided to the system 600 may be converted into RF signals transmitted by the antennas.

Examples of weight processors described herein may calculate weights using Weighted Overlap Beamform and Add (WOBA) techniques. For example, the weight processor 620 may calculate intermediate weights for multiple overlapping subbands of a frequency range. The subbands may include a number of subcarriers over which a frequency response of a channel may be flat (e.g., may be considered to be or processed as if flat) in some examples. Overlapping subbands may have one or more subcarriers in common. For example, overlapping subbands in examples described herein may have 1, 2, 3, 4, 5, 6, 7, 8, 9, 10, or another number of subcarriers in common. A particular subcarrier may be included in multiple sub-bands, such as two subbands (e.g., see FIG. 5). In some examples, calculating the intermediate weights may be implemented by calculating a LS or WLS solution of the subband using the subcarriers or windowed subcarriers, respectively, in the subband. In some examples, the LS or WLS solution may be calculated using a RLS algorithm. The RLS algorithm may include an inverse covariance calculation for each of the subcarriers in the subband. In some examples, the intermediate weights may be calculated by calculating a minimum mean-squared error (MMSE) or weighted MMSE solution of the subband based on the subcarriers in the subband. In some examples, the intermediate weights may be calculated using a direct matrix inversion (DMI) algorithm using the subcarriers in the subband. In some examples, performing the DMI algorithm may include performing a QR-decomposition of the subband or a Modified Gram-Schmidt Orthogonalization (MGSO) of the subband.

Accordingly, intermediate weights may be calculated for each subband within a frequency range. In some examples, some efficiencies may be obtained in calculating intermediate weights for adjacent and/or near subbands, for example, calculating intermediate weights for a given subband (e.g., calculating a LS or WLS solution) using an inverse covariance calculation previously calculated for an adjacent subband. The previously-calculated inverse covariance calculation may be modified using one or more subcarriers of the present subband.

To calculate final weights for a particular subcarrier, the weight processor 620 may calculate a weighted combination of the intermediate weights for the subbands including the particular subcarrier. The weighted combination may be, for example, a weighted sum. Weighting the intermediate weights may be implemented by multiplying the intermediate weights by an overlap factor. The overlap factor used to weight intermediate weights of a subband for a particular subcarrier may be based on (e.g., may be proportional to and/or set by) a distance between a center of the subband and the particular subcarrier. In some examples, the overlap factor may be based on the distance between the center of the respective overlapping subband and the particular subcarrier and a number of subcarriers in the respective overlapping subband. In this manner, intermediate weights calculated for subbands where the particular subcarrier is at or near the center of the subband may be weighted more significantly in a combination than intermediate weights calculated for subbands where the particular subcarrier is at or near an edge of the subband.

Referring back to FIG. 5, for example, a set of intermediate weights may be calculated for subband 526 and a set of intermediate weights may be calculated for subband 528. To calculate a set of final weights for subcarrier 512, weighted sets of intermediate weights may be calculated by (1) weighting the intermediate weights for the subband 526 based on an overlap factor associated with the subcarrier 512 being at an edge of the subband 526 and (2) weighting the intermediate weights for the subband 528 based on an overlap factor associated with the subcarrier 512 being near a center of the subband 526. The weighted sets of intermediate weights may be combined to provide final weights for the subcarrier 512, which final weights may be used by beamforming network 622 of FIG. 6 to send and/or receive transmissions. For example, the final weights may be applied to incoming data streams to receive signals present in the data streams.

Examples of weight processors described herein may calculate weights using recursive methods, such as recursive exponential methods where a forgetting factor may be used. For example, the weight processor may calculate a component used to generate weights for a particular subcarrier using contributions from multiple other subcarriers. The contributions from multiple other subcarriers may be contributions from components use to generate weights for those subcarriers. The components may refer, for example, to a cross-correlation vector and/or an inverse covariance matrix. Contributions from the other subcarriers may be weighted in accordance with a distance of the subcarrier from the present subcarrier for which weights are being calculated. In some examples, contributions from an adjacent subcarrier may be weighted by a forgetting factor. Contributions of other subcarriers may be weighted using an exponential of the forgetting factor based on the distance of the other subcarrier. For example, contributions from a next adjacent subcarrier may be weighted by a square of a forgetting factor. Contributions from a next adjacent subcarrier may be weighted by a cube of a forgetting factor. In this manner, most significant contributions are provided by closer subcarriers (e.g., neighboring subcarriers). In some examples, the number of subcarriers used may be based on a subband (e.g., all subcarriers in a subband may be used, half or another fraction of the subcarriers in a subband may be used in some examples).

Accordingly, for example as described with reference to FIG. 7, an inverse covariance matrix and/or cross-correlation vector may be calculated for a particular subcarrier by updating a previously-calculated inverse covariance matrix and/or cross-correlation vector calculated for a different subcarrier. The previously-calculated component may be weighted, for example by a forgetting factor. The updated cross-correlation vector and/or inverse covariance matrix may be used to calculate weights for the subcarrier, such as by calculating a least squares solution for a subcarrier using these components. In some examples, a direct matrix inversion (DMI) algorithm of the weighted components may be used in calculating the weights.

In some examples, weights may be calculated for a particular subcarrier by traversing subcarriers in two different directions (e.g., forward and backward). The multiple weights calculated in this manner may be combined (e.g., averaged) to arrive at final weights. In the forward traverse, components used in the weight calculation for a particular subcarrier may be based on weighted contributions of components previously-calculated for subcarrier(s) having lower frequencies. In the backward traverse, components used in the weight calculation for a particular subcarrier may be based on weighted contributions of components previously-calculated for subcarrier(s) having higher frequencies.

Weights calculated by the weight processor may be used by beamforming network 622 of FIG. 6 to send and/or receive transmissions. For example, the final weights may be applied to incoming data streams to receive signals present in the data streams.

Examples of weight processors described herein may calculate weights using sliding window methods. It is to be understood that there may be no physical window which is slid across any particular surface. Rather, the window may refer to a group of subcarriers, which may be sequential subcarriers. The group of subcarriers and their weighting may be referred to as a window. Sliding the window generally refers to identifying another group of subcarriers, typically by removing one or more subcarriers from one end of the window and adding one or more subcarriers to the other end of the window. This next group of subcarriers may then be processed as described herein. The window may be slid in increments through an entire frequency band of interest in some examples.

Accordingly, weight processors described herein may utilize a window of subcarrier frequencies. Weights may be calculated for a subcarrier within the window, such as a center subcarrier. For example, an inverse covariance matrix may be calculated for one or more subcarriers in the window based on a previously-calculated inverse covariance matrix for a different window of subcarriers (e.g., a previous window). In some examples, a cross-correlation vector may be calculated for one or more subcarriers in the window based on a previously-calculated cross-correlation vector. The inverse covariance matrix and/or the cross-correlation vector may be updated, for example, by utilizing one or more updates corresponding to subcarriers added to a window relative to the window used for the previously-calculated values, and one or more downdates corresponding to subcarriers no longer present in the widow relative to the window used for the previously-calculated values.

The inverse covariance matrix and/or the cross-correlation vector may be used to calculate the weights for one or more subcarriers in the window. In some examples, the weights may be calculated in part by calculating a least squares solution (e.g. a recursive least squares solution). In some examples, the weights, cross-correlation vector, and/or the inverse covariance matrix may be calculated using a DMI algorithm (e.g., using a QR-decomposition of the previously-calculated value or a Modified Gram-Schmidt Orthogonalization (MGSO) of the previously-calculated value).

Weights calculated by the weight processor may be used by beamforming network 622 of FIG. 6 to send and/or receive transmissions. For example, the final weights may be applied to incoming data streams to receive signals present in the data streams. Note that the weights calculated in accordance with methods described herein may be frequency-localized (e.g., the weights used for one or more subcarriers may differ from the weights used by one or more other subcarriers). Accordingly, beamforming network 622 may utilize weights particular to a subcarrier and/or group of subcarriers being processed by the beamforming network 622. In some examples, the beamforming network 622 may utilize different weights for processing different subcarriers.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components dispersed between them. Similarly, signals may be provided directly to and/or received directly from the recited components without intervening components, but also may be provided to and/or received from the certain components through intervening components.

What is claimed is:

1. A receiver comprising: a processor coupled to memory; a plurality of antennas;
a weights processor configured to calculate, for each subcarrier of a frequency band, a respective plurality of weights used to generate signals for transmission by or combine the signals received at respective ones of the plurality of antennas; and
the weights processor further configured to calculate weights for a particular subcarrier based at least in part on:
calculating an inverse covariance matrix for the particular subcarrier based on a previously-calculated inverse covariance matrix for a different subcarrier.

2. The receiver of claim 1, wherein the plurality of antennas are configured to receive data streams in the frequency band, and wherein the frequency band spans multiple subcarrier frequencies.

3. The receiver of claim 2, further comprising a beamformer in communication with the weights processor, the beamformer configured to receive the data streams received by the plurality of antennas.

4. The receiver of claim 1, wherein the weights processor is further configured to calculate weights for the particular subcarrier based at least in part on:
utilizing a window of subcarrier frequencies, wherein the window of subcarrier frequencies includes the particular subcarrier; and
calculating the inverse covariance matrix for the particular subcarrier based on the previously-calculated inverse covariance matrix for the different subcarrier, wherein a different window of subcarrier frequencies incorporates the different subcarrier.

5. The receiver of claim 4, wherein the different subcarrier is different from each subcarrier of the different window of subcarrier frequencies.

6. The receiver of claim 4, wherein the weights processor is further configured to calculate weights for the particular subcarrier at least in part by:
calculating a least squares solution for the particular subcarrier using the inverse covariance matrix to provide the respective plurality of weights for the particular subcarrier.

7. The receiver of claim 6, wherein the weights processor is further configured to calculate the least squares solution for the particular subcarrier using the inverse covariance matrix to provide the respective plurality of weights for the particular subcarrier based at least in part on performing a recursive least squares algorithm with the inverse covariance matrix for the particular subcarrier.

8. The receiver of claim 7, wherein the recursive least squares algorithm comprises combining the previously-calculated covariance matrix with the different subcarrier of the window of subcarrier frequencies to provide the respective plurality of weights for subcarriers in the window of subcarrier frequencies.

9. The receiver of claim 7, wherein the recursive least squares algorithm comprises an inverse covariance calculation for subcarriers in the window of subcarrier frequencies, and wherein calculating the least squares solution for the particular subcarrier using the inverse covariance matrix comprises using an update of the different subcarrier of the window of subcarrier frequencies and a downdate of another subcarrier of the different window of subcarrier frequencies.

10. The receiver of claim 9, wherein the weights processor is further configured to calculate weights for the particular subcarrier at least in part by:
sliding, to the window of subcarrier frequencies, from the different window of subcarrier frequencies by a subcarrier to incorporate the different subcarrier of the window of subcarrier frequencies.

11. The receiver of claim 4, wherein calculating the inverse covariance matrix for the particular subcarrier based on a previously-calculated covariance matrix for the different subcarrier comprises performing a direct matrix inversion (DMI) algorithm with the previously-calculated covariance matrix for the different subcarrier incorporating the different subcarrier.

12. The receiver of claim 11, wherein performing the DMI algorithm comprises performing a QR-decomposition of the previously-calculated covariance matrix or a Modified Gram-Schmidt Orthogonalization (MGSO) of the previously-calculated covariance matrix.

13. The receiver of claim 1, wherein the receiver is included in a remote node of a wireless network.

14. The receiver of claim 4, wherein the window of subcarrier frequencies is centered at the particular subcarrier.

15. The receiver of claim 1, wherein the weights processor is further configured to provide the respective plurality of weights for the particular subcarrier.

16. The receiver of claim 13, wherein the remote node includes a memory encoded with executable instructions, which, when executed by the weights processor, cause the receiver to calculate the weights for the particular subcarrier.

17. A method comprising:
receiving, at one or more antennas, a plurality of data streams in a range of subcarrier frequencies; and
for each subcarrier in the range of subcarrier frequencies, calculating, at a beamformer, a respective plurality of weights, wherein calculating weights for a particular subcarrier is based at least in part on calculating an inverse covariance matrix for the particular subcarrier based at least in part on a previously-calculated inverse covariance matrix for a different subcarrier.

18. The method of claim 17, wherein calculating weights for the particular subcarrier in the range of subcarrier frequencies is further based at least in part on:
utilizing a window of subcarrier frequencies, wherein the window of subcarrier frequencies includes the particular subcarrier in the range of subcarrier frequencies, and
calculating the inverse covariance matrix for the particular subcarrier based on the previously-calculated inverse covariance matrix for the different subcarrier, wherein a different window of subcarrier frequencies incorporates the different subcarrier.

19. The method of claim 18, wherein the different subcarrier is different from each subcarrier of the different window of subcarrier frequencies.

20. The method of claim 18, further comprising sliding, to the window of subcarrier frequencies, from the different window of subcarrier frequencies by a subcarrier to incorporate the different subcarrier of the window of subcarrier frequencies.

21. The method of claim 20, wherein the sliding further comprises adding an adjacent subcarrier to the different window of subcarrier frequencies and subtracting another adjacent subcarrier from the different window of subcarrier frequencies.

22. The method of claim 18, wherein the window of subcarrier frequencies is centered at the particular subcarrier.

23. The method of claim 17, further comprising providing, at the beamformer, the respective plurality of weights for the particular subcarrier.

24. The method of claim 18, wherein utilizing the window of subcarrier frequencies that includes the particular subcarrier in the range of subcarrier frequencies is based at least on:
identifying a subband to include subcarrier frequencies with training data based on a time-bandwidth product of the subcarrier frequencies; and
centering the window of subcarrier frequencies based on the subband including the subcarrier frequencies with the training data.

25. The method of claim 24, wherein the subband corresponds to a range of subcarriers for which a frequency response of a channel is flat.

26. The method of claim 17, further comprising calculating a least squares solution for the particular subcarrier using the inverse covariance matrix to provide the respective plurality of weights for the particular subcarrier.

27. The method of claim 17, further comprising:
calculating an orthogonal frequency division multiplexing (OFDM) Fast Fourier Transform (FFT) for each of the plurality of data streams to generate a corresponding representation of each of the plurality of data streams in a frequency domain; and
providing the corresponding representation of each of the plurality of data streams in the frequency domain to a respective input of the beamformer.

28. The method of claim 27, wherein each of the plurality of data streams includes training data to generate respective pluralities of weights for respective inputs of the beamformer.

29. The method of claim 17, further comprising:
receiving, at the one or more antennas, at least one additional data stream; and
applying respective pluralities of weights for each respective subcarrier to each additional at least one data stream.

30. The method of claim 17, further comprising:
calculating the inverse covariance matrix for the particular subcarrier based at least in part on using a linear transformation of the plurality of data streams, such that the plurality of data streams comprises an identity spatial covariance matrix of dimension K, where K is a number of antennas of the one or more of antennas.

\* \* \* \* \*